US010917829B2

(12) United States Patent
Kharvar et al.

(10) Patent No.: US 10,917,829 B2
(45) Date of Patent: Feb. 9, 2021

(54) PATH HANDOVER IN BLUETOOTH MESH ROUTING

(71) Applicant: QUALCOMM Incorporated, San Diego, CA (US)

(72) Inventors: Chirag Manojkumar Kharvar, Bangalore (IN); Skanda Kumar Kaipu Narahari, Banashankari (IN); Sourabh Jana, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/362,382

(22) Filed: Mar. 22, 2019

(65) Prior Publication Data

US 2020/0305062 A1    Sep. 24, 2020

(51) Int. Cl.
*H04W 40/36* (2009.01)
*H04W 40/04* (2009.01)
*H04W 40/24* (2009.01)
*H04W 36/30* (2009.01)
*H04W 4/80* (2018.01)
*H04W 84/18* (2009.01)
*H04W 28/08* (2009.01)
*H04W 28/12* (2009.01)

(52) U.S. Cl.
CPC .......... *H04W 40/36* (2013.01); *H04W 4/80* (2018.02); *H04W 28/08* (2013.01); *H04W 28/12* (2013.01); *H04W 36/305* (2018.08); *H04W 40/04* (2013.01); *H04W 40/244* (2013.01); *H04W 40/246* (2013.01); *H04W 40/248* (2013.01); *H04W 84/18* (2013.01)

(58) Field of Classification Search
CPC ... H04W 40/36; H04W 40/248; H04W 84/18; H04W 40/246; H04W 28/08; H04W 40/244; H04W 28/12; H04W 40/04; H04W 4/80; H04W 36/30
See application file for complete search history.

(56) References Cited

U.S. PATENT DOCUMENTS

2008/0212534 A1\* 9/2008 Shitama ................ H04W 36/18
 370/331
2015/0110003 A1\* 4/2015 Wilkinson ............ H04W 40/02
 370/329

\* cited by examiner

*Primary Examiner* — Dady Chery
(74) *Attorney, Agent, or Firm* — Holland & Hart LLP/Qualcon

(57) ABSTRACT

Methods, systems, and devices for wireless communications in a mesh network are described. During a path establishment procedure, a source device may broadcast a path request message, which may be forwarded (e.g., broadcast) by intermediate devices downstream through the mesh network to a destination device. Devices, starting with the destination device and continued upstream through intermediate devices along a path to be established, may feedback path response messages to establish a path between the destination device and the source device. Path response messages transmitted upstream through the mesh network may each include a handover address of a backup intermediate device. Therefore, upon reception of a path response message, an intermediate device selected for path establishment to a destination device may identify a handover address of a backup intermediate device. The intermediate device may perform a handover procedure with the backup intermediate device if a handover condition has been satisfied.

20 Claims, 10 Drawing Sheets

PATH HANDOVER IN BLUETOOTH MESH ROUTING

BACKGROUND

The following relates generally to wireless communications in a mesh network, and more specifically to path handover in Bluetooth mesh routing.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP).

A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. In some examples, wireless mesh networks (e.g., Bluetooth mesh networks) may be used in various environments, such as for home automation, factory automation, etc. In a mesh network, devices or nodes may be connected (e.g., in some non-hierarchical network topology) to one another and may cooperate with one another to efficiently route data to and from various nodes. For example, in some cases, a source device may forward information through devices in the mesh network to a destination device.

SUMMARY

The described techniques relate to improved methods, systems, devices, and apparatuses that support path handover in Bluetooth mesh routing. Generally, the described techniques provide for improved mesh forwarding (e.g., which may include improved path discovery techniques, improved forwarding table management by devices in the mesh network, improved path handover techniques, improved techniques for devices leaving or disconnecting from a mesh network, etc.).

For example, during a path establishment procedure (e.g., during a directed forwarding discovery procedure), a source device may broadcast a path request message, which may be forwarded (e.g., broadcast) by intermediate devices downstream through the mesh network to a destination device. Devices, starting with the destination device and continuing back upstream through devices along a path to be established, may feedback (e.g., via unicast transmissions) path response messages to establish hops between intermediate devices along a path between the destination device and the source device. Path response messages may thus be transmitted upstream back through selected intermediate devices within the mesh network until a path has been established between the source device and the destination device. For example, during the path establishment procedure, a destination device may receive broadcast path request messages from one or more intermediate devices, and the destination device may select an intermediate device based on some path metric. The destination device may transmit a path response message to the selected intermediate device, and the selected intermediate device may update a forwarding table such that any subsequent transmissions (e.g., broadcast transmissions) intended for the destination device (e.g., that are received by the selected intermediate device) may be forwarded by the selected intermediate device.

Further, path response messages transmitted upstream through the mesh network may each include a handover address of another intermediate device (e.g., a handover address of a secondary or backup intermediate device). Therefore, upon reception of a path response message, an intermediate device selected for path establishment to a destination device may both update a forwarding table to include the destination device and identify a handover address of a secondary or backup intermediate device. Should an intermediate device along an established forwarding path determine a handover condition has been satisfied, the intermediate device may perform a handover procedure with the secondary or backup intermediate device (e.g., such that the secondary or backup intermediate device may then forward messages to the destination device). During a handover procedure, an intermediate device in a forwarding path to a destination device may transmit a path handover message to the secondary or backup intermediate device (identified by the handover address included in the initial path request message received from the destination device). The path handover message may include forwarding table information (e.g., a forwarding table entry including source device information and destination device information), such that the secondary or backup intermediate device may then update its forwarding table and replace the disassociating intermediate device in the forwarding path to the destination device.

A method of wireless communications in a mesh network, at a first device, is described. The method may include receiving, during a directed forwarding discovery procedure, a first path establishment message from a second device, where the first path establishment message includes a handover address of a third device. The method may further include storing the handover address of the third device in a forwarding table entry associated with the second device. The method may further include determining a handover condition has been satisfied and transmitting a path handover message to the third device based on the satisfied handover condition and the forwarding table entry, where the path handover message includes path forwarding information associated with the second device.

An apparatus for wireless communications in a mesh network, at a first device, is described. The apparatus may include a processor, memory in electronic communication with the processor, and instructions stored in the memory. The instructions may be executable by the processor to cause the apparatus to receive, during a directed forwarding discovery procedure, a first path establishment message from a second device, where the first path establishment message includes a handover address of a third device, store the handover address of the third device in a forwarding table entry associated with the second device, determine a handover condition has been satisfied, and transmit a path handover message to the third device based on the satisfied handover condition and the forwarding table entry, where the path handover message includes path forwarding information associated with the second device.

Another apparatus for wireless communications in a mesh network, at a first device, is described. The apparatus may include means for receiving, during a directed forwarding discovery procedure, a first path establishment message from a second device, where the first path establishment message includes a handover address of a third device, storing the handover address of the third device in a forwarding table entry associated with the second device, determining a handover condition has been satisfied, and transmitting a path handover message to the third device based on the satisfied handover condition and the forwarding table entry, where the path handover message includes path forwarding information associated with the second device.

A non-transitory computer-readable medium storing code for wireless communications in a mesh network, at a first device, is described. The code may include instructions executable by a processor to receive, during a directed forwarding discovery procedure, a first path establishment message from a second device, where the first path establishment message includes a handover address of a third device, store the handover address of the third device in a forwarding table entry associated with the second device, determine a handover condition has been satisfied, and transmit a path handover message to the third device based on the satisfied handover condition and the forwarding table entry, where the path handover message includes path forwarding information associated with the second device.

Some examples of the method, apparatuses, and non-transitory computer-readable medium described herein may further include operations, features, means, or instructions for transmitting a second path establishment message to a fourth device, where the second path establishment message includes a handover address of a fifth device.

In some examples of the method, apparatuses, and non-transitory computer-readable medium described herein, determining the handover condition may have been satisfied further may include operations, features, means, or instructions for identifying a load balancing parameter may have exceeded a threshold based on a number of forwarding entries included in a forwarding table, where the determination that the handover condition may have been satisfied may be based on the identification that the load balancing parameter may have exceeded the threshold. Some examples of the method, apparatuses, and non-transitory computer-readable medium described herein may further include operations, features, means, or instructions for determining to move away from the network, where the determination that the handover condition may have been satisfied may be based on the determination to move away from the network. Some examples of the method, apparatuses, and non-transitory computer-readable medium described herein may further include operations, features, means, or instructions for identifying a low battery condition, where the determination that the handover condition may have been satisfied may be based on the low battery condition.

Some examples of the method, apparatuses, and non-transitory computer-readable medium described herein may further include operations, features, means, or instructions for receiving a path handover acknowledgment from the third device, and dropping from the mesh network based on the received path handover acknowledgment. Some examples of the method, apparatuses, and non-transitory computer-readable medium described herein may further include operations, features, means, or instructions for determining a handover timeout may have expired, where the handover timeout may be based on the transmitted path handover message.

Some examples of the method, apparatuses, and non-transitory computer-readable medium described herein may further include operations, features, means, or instructions for receiving a first path request message from a fourth device, transmitting a second path request message to the second device based on the received first path request message, and receiving the first path establishment message from the second device based on the transmitted second path request message. In some examples of the method, apparatuses, and non-transitory computer-readable medium described herein, the path handover message may be transmitted to the third device based on a routing credential of the first device.

DETAILED DESCRIPTION

Figure 1:
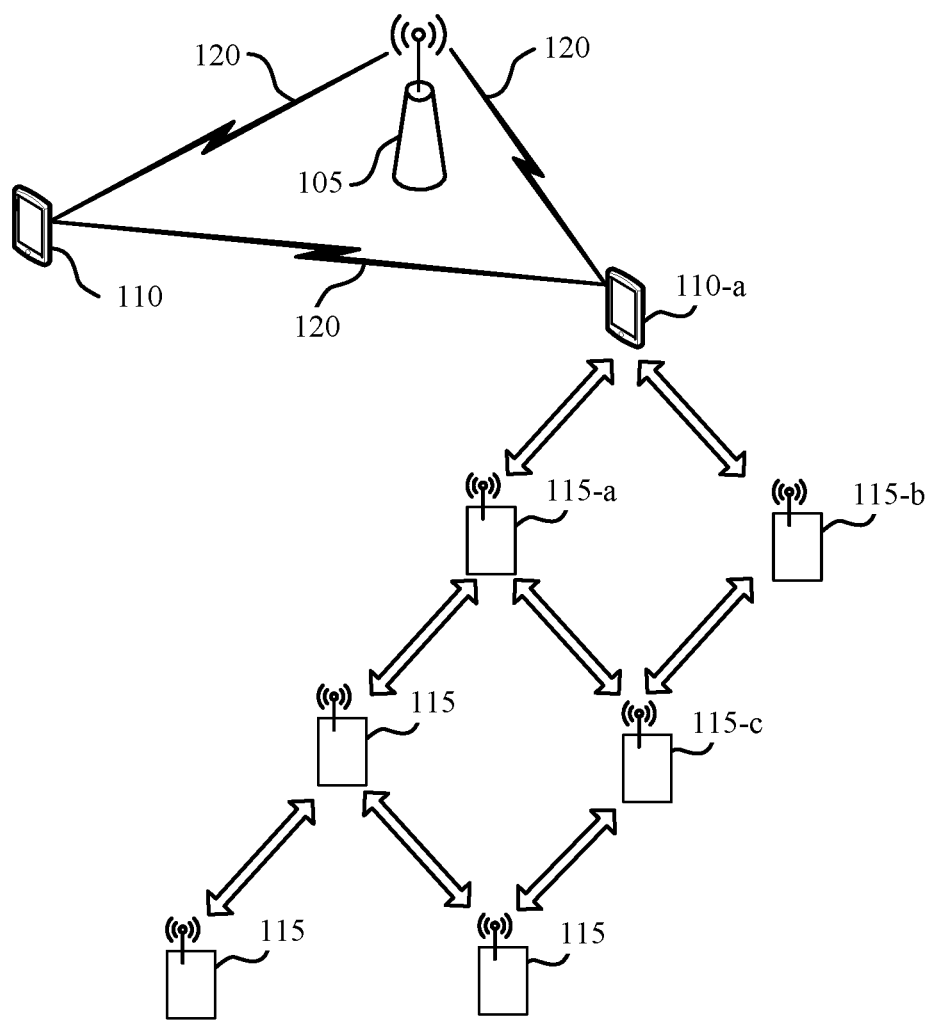
FIG. 1 illustrates an example of a system for wireless communications that supports path handover in Bluetooth mesh routing in accordance with aspects of the present disclosure.

In some cases, wireless mesh networks may be used in various environments, such as for home automation, factory automation, etc. In some examples, different mesh capable devices and appliances may be connected in a wireless mesh network and may be operated by one or more users. Example devices and appliances (e.g., nodes) may include, but are not limited to, automation control panels, automated light switches, automated door locks, factory automation devices, motion sensors, security cameras, smart televisions, water heaters, refrigerators, ovens, stoves, microwaves, fans, heating ventilation air conditioning (HVAC), etc. In a mesh network, devices or nodes may be connected (e.g., in some non-hierarchical network topology) to one another and may cooperate with one another to efficiently route data to and from various devices or nodes. For example, in some cases, a source device may forward information, through devices in the mesh network, to a destination device.

A path establishment procedure (e.g., a directed forwarding discovery procedure) may be performed to establish a path between a source device and a destination device. For example, a source device (e.g., an upstream device, a control device, a master device, a parent device, etc.) in a mesh network may communicate with some downstream destination device via one or more paths through intermediate devices in the mesh network. That is, intermediate devices along a path may relay information downstream from a source device to a destination device and/or may relay information upstream from the destination device to the source device. A path establishment procedure may thus be performed in order to select intermediate devices (e.g., a path) for efficiently relaying such information, such that all devices (e.g., all potential intermediate devices of the mesh network) generally do not unnecessarily congest the mesh network (e.g., relay all received information aimlessly, consume unnecessary overhead, interfere with each other from the perspective of the destination device, etc.).

As such, a path establishment procedure may include upstream devices (e.g., originating at a source device) broadcasting path request messages, and downstream intermediate devices receiving and relaying the path request messages until path request information from the source device is received by the destination device. The destination device may then select an upstream device based on, for example, path metrics associated with one or more path request messages received from upstream devices, and may transmit a path response message to the selected upstream intermediate device. Similarly, the selected intermediate device (e.g., upstream from the destination device) may itself select an intermediate device further upstream, transmit a path response message to the selected upstream intermediate device, and so on, until a path is established from the destination device to the source device through the one or more intermediate devices (e.g., through the one or more intermediate relay devices that have been selected along an upstream path).

However, in some cases, once a path has been established, an intermediate device along the path may be unable to forward or relay information through the mesh network (e.g., an intermediate device may disassociate from the forwarding path). That is, an intermediate device may disconnect from the network or leave the network based on mobility away from the network, a low battery condition, interference or channel conditions, poor path metrics, etc. In other examples, an intermediate device may remain connected in the network, but may be unable to perform relay or forwarding in an established path due to, for example, a load status or too many forwarding commitments (e.g., a full forwarding table). Whenever an intermediate device is no longer able to perform relay or forwarding functionality along an established path, mesh network performance may suffer. For example, the network may realize the intermediate device is no longer forwarding or relaying information after inefficient communications, communication failures, etc. In some cases, when an intermediate device along an established path is unable to forward or relay information through the mesh network, the network (e.g., a source device) may perform additional path establishment procedures to establish new paths. Such path establishment procedures may increase system latency (e.g., as information communications may delayed until such procedures have been completed), may increase system overhead (e.g., due to the broadcasting of additional path request messages and the transmitting of additional path response messages throughout the mesh network), etc. In cases where a disconnecting intermediate device is associated with multiple established paths, such adversities may be compounded.

Generally, the described techniques provide for improved mesh forwarding (e.g., which may include improved path establishment techniques, improved forwarding table management by devices in the mesh network, improved path handover techniques, improved techniques for devices leaving or disconnecting from a mesh network, etc.). For example, during path establishment procedures, path response messages transmitted from a downstream device to a selected upstream intermediate device may include a handover address of another intermediate device (e.g., a handover address of a secondary or backup intermediate device). The handover address of the secondary or backup intermediate device may be used by the selected upstream intermediate device for handover procedures. Should the selected upstream intermediate device (e.g., the intermediate device selected by the downstream device) disassociate from a forwarding path (e.g., no longer relay information along the path), the selected upstream intermediate device may perform a handover procedure with the backup intermediate device. The backup intermediate device may then serve as the upstream intermediate relay (e.g., from the perspective of the downstream device). As such, mesh network forwarding paths or mesh network relay paths may be modified via handover procedures between intermediate devices, without performing new or additional path establishment procedures.

That is, upon reception of a path response message, an upstream intermediate device may update its forwarding table to include the destination device and may identify a handover address of a secondary or backup intermediate device. Therefore, should an intermediate device along an established forwarding path determine a handover condition has been satisfied, the intermediate device may perform a handover procedure with the secondary or backup intermediate device. Handover conditions may include, or be based on, load balancing conditions (e.g., a number of entries in a forwarding table), buffer status conditions, a battery status, device mobility, etc. Following the handover procedure, the intermediate device may disassociate from the path, and the secondary or backup intermediate device may forward messages (e.g., messages that correspond to the forwarding table entry received during the handover procedure) to the destination device.

During a handover procedure, an intermediate device disassociating from the forwarding path may transmit a path handover message to the secondary or backup intermediate device (e.g., which may be identified by the handover address included in a path request message received from a downstream device during the path establishment procedure). The path handover message may include forwarding table information (e.g., a forwarding table entry including source device information and destination device information), such that the secondary or backup intermediate device may then update its forwarding table (e.g., to include itself in the forwarding path between the source device and the destination device and replace the disassociating intermediate device). In some cases, the handover procedure may include a path handover acknowledgment from the backup intermediate device (e.g., in response to the path handover message from the disassociating intermediate device). In such cases, the disassociating intermediate device may disassociate from the path based on (e.g., upon) receiving the path handover acknowledgment. Additionally or alternatively, a disassociating intermediate device may disassociate from the path based on expiration of a handover timeout (e.g., expiration of a timer or time duration initiated upon transmission of the path handover message).

Aspects of the disclosure are initially described in the context of a wireless communications system. Example mesh networks implementing aspects of the discussed techniques are then described. Aspects of the disclosure are further illustrated by and described with reference to apparatus diagrams, system diagrams, and flowcharts that relate to path handover in Bluetooth mesh routing.

FIG. 1 illustrates a wireless communications system 100 (e.g., which may include to refer to or include a wireless personal area network (PAN), a mesh network, a wireless local area network (WLAN), a Wi-Fi network) configured in accordance with various aspects of the present disclosure. The example wireless communications system 100 may include an AP 105, devices 110 (e.g., which may be referred to as source devices, master devices, etc.), and mesh network devices 115 (e.g., which may be referred to as sink devices, slave devices, etc.). In the present example, AP 105 and devices 110 may implement WLAN communications (e.g., Wi-Fi communications) and source device 110-a and mesh network devices 115 may implement short-range communications (e.g., Bluetooth communications). For example, devices 110 may include cell phones, mobile stations, personal digital assistant (PDAs), other handheld devices, netbooks, notebook computers, tablet computers, laptops, user equipment (UEs), wireless stations (STAs), or some other suitable terminology. Mesh network devices 115 may include Bluetooth mesh network devices capable of pairing and communicating with other Bluetooth mesh network devices, which may include home automation devices (e.g., automation control panels, automated light switches, automated door locks, motion sensors, security cameras, smart televisions, water heaters, refrigerators, ovens, stoves, microwaves, fans), wireless audio devices (e.g., speakers, headsets, ear pieces, headphones), display devices (e.g., TVs, computer monitors), meters, valves, etc.

Bluetooth communications may refer to a short-range communication protocol and may be used to connect and exchange information between source devices 110 and mesh network devices 115 (e.g., between mobile phones, computers, controllers, sensors, digital cameras, wireless headsets, speakers, keyboards, mice or other input peripherals, and similar devices). Some Bluetooth systems (e.g., aspects of wireless communications system 100) may be organized using a master-slave relationship employing a time division duplex protocol having, for example, defined time slots of 625 mu secs, in which transmission alternates between the master device (e.g., a source device 110) and one or more slave devices (e.g., mesh network devices 115). In some cases, a source device 110 may refer to a master device or controller, and a mesh network device 115 may refer to a slave device or intermediate node in a mesh network. As such, in some cases, a device may be referred to as either a source device 110 or a mesh network device 115 based on the role configuration of the device in the mesh network. That is, designation of a device as either a source device 110 or a mesh network device 115 may not necessarily indicate a distinction in device capability, but rather may refer to or indicate roles held by the device in the mesh network. Generally, a source device 110 may refer to a wireless communication device capable of wirelessly exchanging data signals with another device (e.g., a mesh network device 115), and a mesh network device 115 may refer to a device operating in a mesh network that is capable of exchanging data signals with source device 110 and other mesh network devices (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs (e.g., roles for a source device 110-a and mesh network devices 115) that together form a single use case called a profile (e.g., for communications between the source device 110-a and the mesh network devices 115). One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., source device 110-a) implements an audio source device (SRC) role and another device (e.g., a mesh network device 115) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low cost silicon device containing the Bluetooth radio and a microprocessor. The controller stack may be responsible for setting up communication links such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A communication link established between two Bluetooth devices may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device are acknowledged, and may be retransmitted if not acknowledged during a retransmission window. In addition, audio may be streamed between a source device and a paired device using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In example wireless communications system 100, a mesh network may include mesh network devices 115 and source device 110-a. The source device 110-a may be connected to a core network, the Internet, etc. via AP 105 (e.g., and may thus connect the mesh network to a core network, the Internet, etc.). In some cases, a device (e.g., a controller or source device 110-a) may be capable of both Bluetooth and WLAN communications. For example, WLAN and Bluetooth components may be co-located within a device, such that the device may be capable of communicating according to both Bluetooth and WLAN communication protocols. Each technology may offer different benefits or may improve user experience in different conditions. A source device 110-a may, in some cases, support WLAN communications via AP 105, which may include communicating over wireless links 120 (e.g., WLAN communication links). The AP 105 and the associated source devices 110 may represent a basic service set (BSS) or an extended service set (ESS). The various source devices 110 in the network may be able to communicate with one another through the AP 105. In some cases the AP 105 may be associated with a coverage area, which may represent a basic service area (BSA).

Source devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communications system 100, and devices may communicate with each other via wireless links 120 (e.g., Wi-Fi Direct connections, Wi-Fi Tunneled Direct Link Setup (TDLS) links, peer-to-peer communication links, other peer or group connections). AP 105 may be coupled to a network, such as the Internet, and may enable a source device 110 to communicate via the network (or communicate with other source devices 110 coupled to the AP 105). A source device 110 may communicate with a network device bi-directionally. For example, in a WLAN, a source device 110 may communicate with an associated AP 105 via downlink (e.g., the communication link from the AP 105 to the source device 110) and uplink (e.g., the communication link from the source device 110 to the AP 105).

In the example of FIG. 1, a mesh network may include source device 110-a and mesh network devices 115. Source device 110-a may convey information through the mesh network via path forwarding or relay techniques. For example, the mesh network may relay information from a source device 110-a to a destination device, such as mesh network device 115-c, through one or more intermediate devices (e.g., such as through mesh network device 115-a and/or mesh network device 115-b).

In general, to establish relay or forwarding paths throughout a mesh network, one or more upstream devices (e.g., source device 110-a) may broadcast path request messages. Downstream mesh network devices (e.g., mesh network device 115-a and mesh network device 115-b) may receive one or more path request messages, and may themselves broadcast path request messages to mesh network devices yet further downstream. Such broadcasting of path request messages may continue downstream through the mesh network (e.g., until mesh network devices furthest downstream, or furthest away from the source device 110-a, have received a path request message). Downstream mesh network devices may then select upstream mesh network devices based on, for example, path metrics (e.g., latency of paths corresponding to path request messages received from one or more upstream mesh network devices, length of a path of paths corresponding to path request messages received from one or more upstream mesh network devices, path stability of paths corresponding to path request messages received from one or more upstream mesh network devices, upstream mesh network device metrics, path request message signal strength metrics, etc.). That is, a mesh network device may select an upstream intermediate mesh network device based on path metrics included in the one or more received path request messages (e.g., path metrics may determine the best mesh network device for forwarding path establishment).

As such, mesh network devices 115 located throughout the mesh network may establish a path to the source device through (e.g., via path response messaging to selected upstream mesh network devices). When an upstream mesh network device is selected by a downstream mesh network device (e.g., when an upstream mesh network device is in an established path to some downstream mesh network device), the upstream mesh network device (e.g., from the perspective of the downstream mesh network device) may forward or relay any information intended for the downstream mesh network device). For example, mesh network devices may each maintain a forwarding table including entries or identification information of downstream mesh network devices for which the intermediate mesh network device is responsible for path forwarding techniques. When a mesh network device (e.g., mesh network device 115-a) receives a path response message from a downstream mesh network device (e.g., mesh network device 115-c), the mesh network device may update the forwarding table and may effectively become part of the forwarding path to the downstream mesh network device. When the mesh network device 115-a receives a transmission with information intended for the mesh network device 115-c (e.g., when mesh network device 115-a receives a transmission with a preamble indicating mesh network device 115-c is the destination device for the information), the mesh network device 115-a may forward (e.g., relay, broadcast, transmit, etc.) the transmission to the mesh network device 115-c.

In some examples, a path establishment procedure may include or refer to a directed forwarding procedure. Devices in a mesh network may support directed forwarding features (e.g., may have the capability to discover and maintain paths toward target destinations and to filter out mesh messages directed to some mesh network devices, such as messages directed to mesh network devices associated with other paths, mesh network devices not reachable along any path, etc.). In some cases, a mesh network device that supports the directed forwarding feature may have this feature disabled. When the directed forwarding feature is disabled, the mesh network device may still support the directed forwarding feature, but it may not be performing the functionality required by that feature. A mesh network device that supports the directed forwarding feature and has the directed forwarding feature enabled may be referred to as a directed forwarding mesh network device. A directed forwarding mesh network device that has the relay feature enabled may be referred to as a directed relay mesh network device. A directed forwarding mesh network device that does not support the relay feature or that has the relay feature disabled may act as a path originator (e.g., a source device) or a path destination (e.g., a destination device).

The directed forwarding feature may be based on a hybrid reactive and proactive protocol that is followed (e.g., by mesh network devices) to perform discovery and maintenance of paths. A directed forwarding discovery operation may find a valid path between directed forwarding mesh network devices (e.g., a path between the source device or mesh network device that originates messages, the data originator, and the other mesh network device that is the destination of such messages, the data destination). This procedure may be initiated on-demand by the data originator. The data destination can be either one or more elements of a single mesh network device or a group of mesh network devices that are subscribed to the same group address or virtual address. When a data originator wishes to communicate with a target data destination and it does not have knowledge of a path to the target data destination, the data originator may broadcast a path request message (PREQ) to find valid paths. In this case, the data originator performs as a path originator. The PREQ message may be re-broadcast by directed relay mesh network devices (e.g., by downstream directed relay mesh network devices). A path (e.g., in some cases several paths) may be found when PREQ reaches the target data destination (e.g., which may then be referred to as the path destination).

In some cases, the path may be made available by unicasting, hop by hop, a path reply message (PREP) (e.g., which may be referred to as a path response message) back to the path originator. This operation or procedure may be referred to as directed forwarding establishment. Each directed forwarding mesh network device that receives the PREQ may store information of a path back to the path originator (e.g., the backward path information or upstream path information), so that the PREP may be unicast along the backward path to the path originator from the path destination. Further, each directed forwarding mesh network device that receives the PREP may store information of a path toward the path destination (e.g., the forward path information or downstream path information), which may be used later by the path originator and intermediate directed relay mesh network devices along the forward path to forward messages addressed to the path destination.

In the directed forwarding feature, the overall effect of combining reactive and proactive approaches may be that a path is followed from the path originator to the neighborhood of the path destination. Within the neighborhood of the destination, the forwarding mechanism may continue as a managed flooding. The directed forwarding feature may use a control sequence number that is defined as forwarding number, which may be separate from the sequence numbers used for the message caching and the replay protection procedures (e.g., the SEQ field of the network packet format).

The directed forwarding feature may provide the way to configure a path metric (e.g., a distance, cost, or quality metric) that may be used to measure, rank, and select the paths (e.g., the shortest path, lowest cost path, best quality path, etc.) that access messages or transport messages will traverse. A good path metric may allow for the selection of stable paths. For example, path metrics may be used to avoid frequent discovery operations (e.g., creation and use of different paths) because of paths that soon become invalid or congested (e.g., a path metric may identify paths that may soon become invalid or congested). Path metrics may further improve network performance (e.g., in terms of latency and use of bandwidth). In some examples, hop-wise path length may be used as a path metric. However, in some cases (e.g., in dense networks) multiple paths may be the same length. In some cases, other path metrics may further take into account path stability (or longevity).

A path may be composed of mesh network devices and the links between them. Therefore, a path metric (PM) may be based on a node metric (NM) (e.g., a mesh network device metric) and a link metric (LM), and the path metric may be calculated according to the composition of the path. Generally, a loop-free path (p) may be composed of L links ($l_i$) between pairs of mesh network devices or pairs of nodes ($n_i$ and $n_{i+1}$), with the index i in the range of (0, L−1). $NM(n_i)$ and $LM(l_i)$ may refer to the metrics associated with the $i^{th}$ node and the $i^{th}$ link, respectively. For example, for a path (p):

$$(n_0)\text{-------}l_0\text{-------}(n_1) - - - (n_i)\text{-------}l_i\text{-------}(n_{i+1}) - - -$$
$$(n_{L-1})\text{-------}l_{L-1}\text{-------}(n_L)$$

the metric associated with the path p may be:

$$PM(p) = \Sigma_i^{L-1} NM(n_i) + \Sigma_i^{L-1} NM(l_i)$$

In some directed forwarding configurations, the path metric state may determine the choice of both the node metric and the link metric.

For directed forwarding techniques, mesh network devices may maintain a forwarding table. Each directed forwarding mesh network device may filter messages to be forwarded based on its forwarding table state. The forwarding table state may be updated by directed forwarding operations that the mesh network device is involved in or may be updated as an effect of processing of configuration messages issued by a provisioner. The processing of messages exchanged in the context of directed forwarding operations may affect the management of non-fixed path entries of a forwarding table. For example, the forwarding table may initially be empty. The forwarding table may be updated whenever any directed forwarding control message or, in some cases, any application message is received and processed. A new entry may be created and inserted when a PREP message reports an unknown (path originator (PO), path destination (PD)) pair. In other words, a new entry for a PREP may be added only if no matching (PO, PD) exists in the table. For making the decision of whether or not to relay, the forwarding table may be referred to by the mesh network device. If <source (SRC), destination (DST)> of a received message matches with one of the entries of <PO, PD> in the forwarding table, the message may be relayed. If <SRC, DST> of a received messages does not match any entries of <PO, PD> in the forwarding table, the message may be dropped.

Each network packet data unit (PDU) may be secured using security material that is composed of the network identifier (ND), the Encryption Key, and the Privacy Key derived using the k2 function with security credentials as inputs. The directed security material may be derived from the master security credentials (e.g., a network key in Bluetooth mesh networks) using the following formula:

NID||EncryptionKey||PrivacyKey=i k2(NetKey, 0×02)

Network PDUs to be forwarded according to the directed forwarding feature may use the directed security material (e.g., messages communicated within the mesh network may be transmitted using routing credentials). Network PDUs to be flooded use the master security material (e.g., in accordance with a Mesh Profile specification). For example, a network may be established using a network key. The network key may be used by nodes (e.g., mesh network devices) in the network for encryption purposes (e.g., routing keys or routing credentials may be generated or identified based on the network key).

The mesh network of wireless communications system 100 (e.g., mesh network devices 115 and source device 110-a) may implement the Bluetooth mesh routing path handover techniques described herein. During path establishment procedures, path response messages transmitted from downstream mesh network devices (e.g., mesh network device 115-c) to selected upstream mesh network devices (e.g., mesh network device 115-a) may include a handover address of another intermediate mesh network device (e.g., a handover address of a secondary or backup mesh network device such as, for example, mesh network device 115-b). The handover address of the secondary or backup mesh network device may be used by the selected upstream mesh network device for handover procedures. Should the selected upstream mesh network device (e.g., the upstream mesh network device selected by the downstream mesh network device) disassociate from the forwarding path, the selected upstream mesh network device may perform a handover procedure with the backup mesh network device. The backup mesh network device may then serve as the upstream intermediate relay (e.g., from the perspective of the downstream device). As such, mesh network forwarding paths or mesh network relay paths may be modified via handover procedures between mesh network devices, without performing new or additional path establishment procedures.

That is, upon reception of a path response message, an upstream intermediate device (e.g., mesh network device 115-a) may update its forwarding table to include the destination device (e.g., mesh network device 115-c) and may identify a handover address of a secondary or backup intermediate device (e.g., mesh network device 115-b). Therefore, should an intermediate device (e.g., mesh network device 115-a) along an established forwarding path determine a handover condition has been satisfied, the intermediate device (e.g., mesh network device 115-a) may perform a handover procedure with the secondary or backup intermediate device (e.g., with mesh network device 115-b).

Handover conditions may include or be based on load balancing conditions (e.g., a number of entries in a forwarding table of mesh network device 115-a), buffer status conditions, a battery status, device mobility relative to the mesh network, etc. Following the handover procedure, the intermediate device (e.g., mesh network device 115-a) may disassociate from the path, and the secondary or backup intermediate device (e.g., mesh network device 115-b) may forward messages to the destination device (e.g., mesh network device 115-c).

During a handover procedure, an intermediate device disassociating from the forwarding path (e.g., mesh network device 115-a) may transmit a path handover message to the mesh network device 115-b (e.g., which may be identified by the handover address included in a path request message received from the mesh network device 115-c during the path establishment procedure). The path handover message may include forwarding table information (e.g., a forwarding table entry including source device 110-a information and destination mesh network device 115-c information), such that the mesh network device 115-b may then update its forwarding table (e.g., effectively joining the forwarding path between the source device 110-a and the destination mesh network device 115-c and replacing the disassociating mesh network device 115-a). In some cases, the handover procedure may include a path handover acknowledgment from the mesh network device 115-b (e.g., in response to the path handover message from the disassociating mesh network device 115-a). In such cases, the disassociating mesh network device 115-a may disassociate from the path based on (e.g., upon) receiving the path handover acknowledgment. Additionally or alternatively, the disassociating mesh network device 115-a may disassociate from the path based on expiration of a handover timeout (e.g., expiration of a timer or time duration initiated upon mesh network device 115-a transmission of the path handover message).

Figure 2:
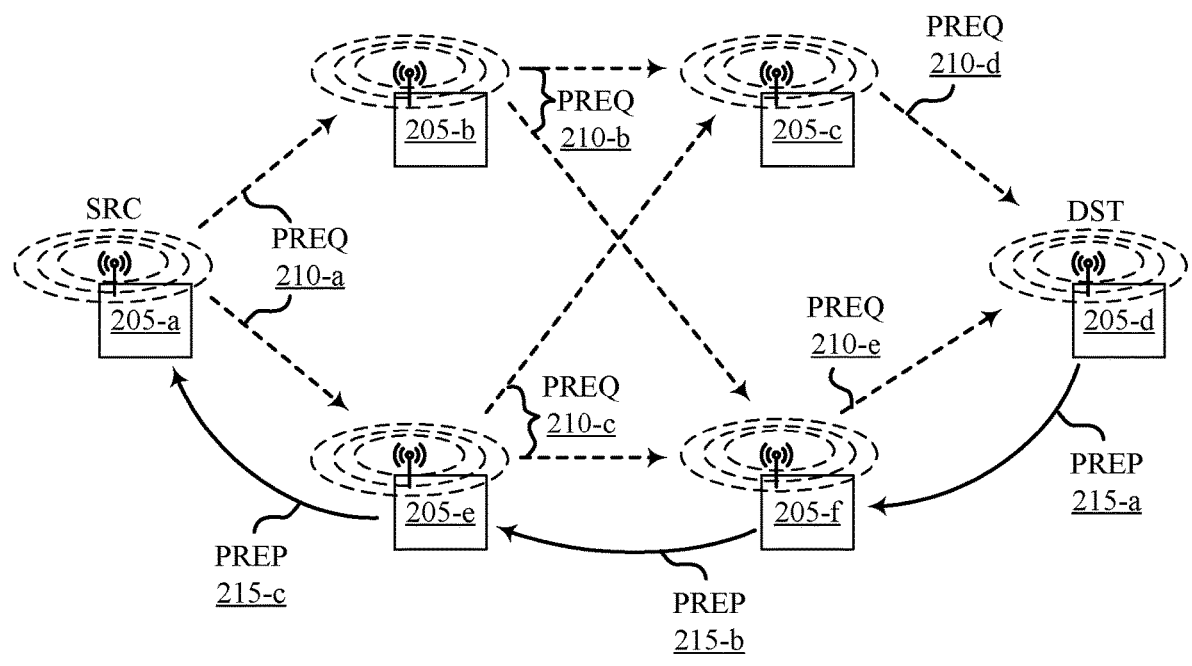
FIG. 2 illustrates an example of a mesh network that supports path handover in Bluetooth mesh routing in accordance with aspects of the present disclosure.

FIG. 2 illustrates an example of a mesh network 200 that supports Bluetooth mesh routing in accordance with aspects of the present disclosure. In some examples, mesh network 200 may implement aspects of wireless communications system 100. For example, mesh network 200 may include mesh network device 205-a, mesh network device 205-b, mesh network device 205-c, mesh network device 205-d, mesh network device 205-e, and mesh network device 205-f, which in some cases may be examples of mesh network devices 115 as described with reference to FIG. 1. Mesh network 200 may implement path establishment procedures described herein, and the example of FIG. 2 may illustrate a path establishment procedure for establishment of a forwarding path between a source device (mesh network device 205-a) and a destination device (mesh network device 205-d).

In some mesh networks (e.g., in some Bluetooth mesh networks), blind packet relaying techniques (e.g., where mesh network devices relay many transmissions through the mesh network relatively aimlessly) may be used, which may lead to congestion, interference, unnecessary overhead consumption, etc. To avoid this to some extent, Time to Live (TTL) and Network Message Cache techniques may be used, and may reduce the relaying of packets to some extent. However, these techniques may not solve the problem of blind relaying as their capabilities may be limited. To mitigate this blind relaying, mesh networks may implement directed forwarding (e.g., mesh routing) techniques. Directed forwarding techniques may establish routes (e.g., or forwarding paths) towards destination device from a given source device. Hence, only the mesh network devices that are present on, or participate in, the established path may relay packets. Such techniques may stop or reduce excessive relaying (e.g., blind packet relaying).

In directed forwarding, the mesh network devices that want to communicate in the network may establish paths towards destination mesh network devices, and then may send packets to that path. For this purpose, mesh network devices may exchange messages such as PREQ, PREP, and path confirm or path configure (PCONF) to establish a complete path. Mesh network devices participating in the established path (e.g., once the path is established) may update their forwarding table by adding an entry for <SRC, DST>. At the time of relaying, the mesh network devices may receive a packet and may first check their entry in the forwarding table to determine whether they are supposed to relay the packet or not (e.g., whether there is an entry present for the given SRC and DST in the mesh network device's forwarding table). If the forwarding table permits the mesh network device to relay the packet, the mesh network device will relay the packet. Otherwise, the packet may be dropped (e.g., which may effectively stop or reduce excessive relaying or blind packet relaying by the mesh network).

Mesh network 200 may implement path establishment procedures (e.g., directed forwarding techniques) to establish a path between a source device (e.g., mesh network device 205-a) and a destination device (e.g., mesh network device 205-d). Source mesh network device 205-a may desire to communicate with mesh network device 205-d, and may broadcast a PREQ transmission 210-a. Mesh network device 205-b and mesh network device 205-e may receive the broadcast PREQ transmission 210-a (e.g., as mesh network device 205-b and mesh network device 205-e may be within range of mesh network device 205-a). Mesh network device 205-b and mesh network device 205-e may then broadcast the PREQ from the source mesh network device 205-a (e.g., via PREQ transmission 210-b and PREQ transmission 210-c, respectively). Mesh network device 205-c and mesh network device 205-f may receive the PREQ from the source mesh network device 205-a (e.g., via receiving PREQ transmission 210-b broadcast by mesh network device 205-b and/or PREQ transmission 210-c broadcast by mesh network device 205-e). Mesh network device 205-c and mesh network device 205-f may then themselves broadcast the PREQ (e.g., via PREQ transmission 210-d and PREQ transmission 210-e, respectively).

The destination mesh network device 205-d may thus receive the PREQ message originating from the source mesh network device 205-a from both mesh network device 205-c and mesh network device 205-f. The destination mesh network device 205-d may select an upstream mesh network device or a path based on one or more path metrics (e.g., path parameters), channel conditions, etc. For example, destination mesh network device 205-d may choose a path based on path metrics such as hop count, path length, average received signal strength indication (RSSI) value over the path, node metrics, etc. In some cases, the path metrics or selection parameters to be used by the destination mesh network device 205-d may be selected or configured by the source mesh network device 205-a (e.g., the PREQ message may include criteria for path selection by the destination mesh network device 205-d).

In the example of FIG. 2, destination mesh network device 205-d may select a path (A-E-F-D) (e.g., a forwarding path including source mesh network device 205-a, mesh network device 205-e, mesh network device 205-f, and destination mesh network device 205-d). The destination mesh network device 205-d may thus transmit a PREP message to mesh network device 205-f (e.g., a unicast PREP transmission 215-a). The mesh network device 205-f may transmit the PREP message to mesh network device 205-e (e.g., a unicast PREP transmission 215-b), and the mesh network device 205-e may transmit the PREP message to source mesh network device 205-a (e.g., a unicast PREP transmission 215-c). As such, a forwarding path (e.g., a path A-E-F-D) may be established between source mesh network device 205-a and destination mesh network device 205-d. Generally, PREQ packets may be broadcast packets and may be sent to ALL DIRECTED FORWARDING NODES, whereas PREP is a unicast packet where DST may be taken from a Discovery table.

That is, in mesh network 200, PREQ is a message which may be sent by the path originator (PO) (e.g., source mesh network device 205-a). Source mesh network device 205-a may maintain the information regarding the path metric to be used (e.g., for path selection by the destination mesh network device 205-d). All the intermediate mesh network devices that receive a broadcast PREQ message may update the value of the path metric (e.g., increment it by 1, in cases where the path metric is hop count, update some path length or RSSI value, etc.). Finally, PREQ message(s) may reach the path destination (PD) (e.g., destination mesh network device 205-d). In the present example, mesh network device 205-d may receive two PREQs, a PREQ from mesh network device 205-c and a PREQ from mesh network device 205-f. Destination mesh network device 205-d may chose a path or upstream mesh network device (e.g., according to the path metrics included in the received PREQ transmission 210-d and PREQ transmission 210-e), and may transmit a PREP message to the selected upstream mesh network device. Hence destination mesh network device 205-d sends PREP transmission 215-a to mesh network device 205-f. Mesh network device 205-f repeats the same procedure (e.g., a path or upstream mesh network device selection procedure based on path metrics included in PREQ transmission 210-b and PREQ transmission 210-c) and chooses mesh network device 205-e. Mesh network device 205-e repeats the same procedure, and the path A-E-F-D is established.

Each intermediate mesh network device which receives a PREP message during the path establishment procedure updates its forwarding table by adding the entry of <PO, PD>. Therefore, to use the established path, mesh network device 205-a broadcasts a normal message (e.g., meant for communication of information) based on routing credentials (e.g., and the packet or message may include a preamble with PO and/or PD information). All the mesh network devices which has an entry for <PO, PD>, forwards the message and others drops it. That is, mesh network device 205-e may receive the message, check its forwarding table, and broadcast the information. Mesh network device 205-b may receive the message, check its forwarding table, drop the packet (e.g., not broadcast the information). As such, following the path establishment procedure, source mesh network device 205-a may communicate information to destination mesh network device 205-d (e.g., via the established path A-E-F-D), and other mesh network devices (e.g., mesh network device 205-b and mesh network device 205-c) may drop any of such communications, effectively reducing mesh network congestion while still effectively providing for mesh routing between source devices and destination devices.

Other examples of path metrics that may be used for path establishment procedures include network utilization factor (NUF) and common node count (CNC). An NUF path metric may provide for improved utilization of network resources.

NUF may be calculated by counting the number of entries available in the forwarding table of a directed forwarding mesh network device for relay purposes (e.g., both when the PO and the PD is not the mesh network device itself). The higher the NUF, the more the mesh network device is being utilized for directed forwarding relaying. That is, an NUF path metric may indicate relay loads (e.g., forwarding table status, load balancing status, etc.) of the mesh network device. Since a mesh network device may also have its own tasks to perform (e.g., publication, heartbeat, performing user commands etc., which may be associated with a higher priority than relaying), the NUF path metric may be utilized till certain extent (e.g., other parameters or path metrics may be considered for path selection purposes). In general, an NUF path metric may be used such that mesh network devices select paths associated with a lesser overall NUF. CNC may refer to a path metric for less usage of a common node (e.g., a common mesh network device) in multiple path scenarios. If a common node is being used in N paths, then removing the node from the network will result in all N paths being rediscovered (e.g., new path establishment procedures to be performed for the N paths) which may lead to more congestion in the network. CNC may be calculated by counting the number of forwarding table entries where either PO or PD matches the <PO, PD> present in the PREQ message. The path with the lowest CNC may be chosen for given <PO, PD>.

In some cases, mesh network devices 205 in mesh network 200 may perform new or additional path establishment procedures when a directed forwarding mesh network device 205 disassociates from an established directed forwarding path. For example, a directed forwarding mesh network device 205 (e.g., mesh network device 205-*f*) may go down, move away from the network, perform a load balancing procedure and no longer relay for the directed forwarding path, etc. In some cases, neighboring mesh network devices (e.g., mesh network device 205-*d* and/or mesh network device 205-*e*) may discover the mesh network device 205-*f* has disassociated from the path, and one or more of the neighboring mesh network devices 205 may send a path error (PERROR) message (e.g., a message indicating that the mesh network device 205-*f* is down). Once this information (e.g., the PERROR message) is propagated to the PO of the path (e.g., to mesh network device 205-*a*), the PO may perform a path rediscovery procedure to establish a new path to the PD (e.g., mesh network device 205-*a* may perform an additional path establishment procedure to establish a new path to mesh network device 205-*d*). For example, a new path, A-B-C-D, may be established.

However, such rediscovery procedures may be associated with increased overhead consumption (e.g., rediscovery mechanisms may exchange new messages), which may increase mesh network congestion, lead to increased power consumption by mesh network devices 205, increase mesh network latency, etc. For example, PERROR messages may utilize overhead (e.g., add to mesh network communication congestion). Further, PERROR messages may take time to propagate through the mesh network. Until the PERROR message has propagated to the PO, the PO may be unaware and may send additional messages (e.g., increasing overhead) that may not be received as the path may be broken. Further, such propagation delay may result in mesh network latency, as the PO may trigger rediscovery procedures after the PERROR message has been propagated back to the PO (e.g., and the rediscovery procedure itself may add to mesh network latency as well). If the disassociating mesh network device is included in many paths, such rediscovery procedures (e.g., and the inherent increases in overhead consumption, mesh network latency, etc.) may be compounded.

As discussed herein, the described techniques may provide for improved path establishment procedures, path handover mechanisms, improved path disassociation techniques, etc. For example, path handover addresses may be exchanged during path establishment procedures, and a mesh network device 205 disassociating from an established path may perform path handover via exchanged path handover addresses. That is, a mesh network device disassociating from a directed forwarding path may perform path handover techniques, as described herein. The decision for performing a path handover procedure (e.g., potential triggers for path handover techniques) may include mesh network device 205 mobility (e.g., relative to the mesh network, the PO, the PD, etc.), a battery status of the mesh network device 205 (e.g., the mesh network device may determine that the battery is going to discharge in sometime), dynamic load balancing techniques or the forwarding table status of the mesh network device 205 (e.g., mesh network device 205 may determine that its forwarding table is full and may handover few paths to other mesh network devices in the network), the NUF or CNC status of the mesh network device 205 (e.g., if the mesh network device 205 has reached some threshold NUF or threshold CNC), etc.

In some examples, mesh network devices 205 may include path handover addresses in signaling (e.g., PREP messages or path response messages) communicated during path establishment procedures. During a path establishment procedure, mesh network devices 205 may select a path and identify one or more path handover candidate (e.g., secondary or backup mesh network devices 205) based on received PREQ transmissions 210. Mesh network devices 205 may then include a path handover address in PREP transmissions 215 sent back upstream along a selected path to a selected intermediate mesh network device 205. That is, during path establishment procedures, path response messages (e.g., upstream path establishment signaling through the mesh network to a source device or to a PO) may include a path handover address of a backup mesh network device 205. A mesh network device 205 receiving the path response message (e.g., a PREP transmission 215) may thus identify a backup mesh network device 205 for a handover procedure. If the mesh network device 205 receiving the path response message determines a handover condition has been satisfied, the mesh network device 205 may perform a handover procedure with the backup mesh network device 205 using the path handover address.

For example, for mesh network device 205-*a* (e.g., a source device, a PO) to communicate with mesh network device 205-*d* (e.g., a destination device, a PD), mesh network device 205-*a* may initiate a path establishment procedure (e.g., a directed forwarding discovery procedure) by broadcasting a path request message (e.g., via PREQ transmission 210-*a*). Intermediate or relaying mesh network devices 205 (e.g., mesh network device 205-*b*, mesh network device 205-*e*, mesh network device 205-*c*, and mesh network device 205-*f*) may forward the path request message (e.g., via PREQ transmission 210-*b*, PREQ transmission 210-*c*, PREQ transmission 210-*d*, and PREQ transmission 210-*e*, respectively). The destination mesh network device 205-*d* may receive the path request message via PREQ transmission 210-*d* (e.g., from mesh network device 205-*c*) and PREQ transmission 210-*e* (e.g., from mesh network device 205-*f*). Based on the received path request messages, destination mesh network device 205-*d* may select a path (e.g., a mesh network device 205) and a handover path (e.g., a backup mesh network device 205) based on path metrics corresponding to the received path request messages. In the example of FIG. 2, mesh network device 205-*d* may select mesh network device 205-*f* (e.g., as PREQ transmission 210-*e* may indicate a better path metric), and may identify backup mesh network device 205-*c* (e.g., based on receiving the PREQ transmission 210-*d*). In cases where a mesh network device receives several PREQ transmissions 210, a backup mesh network device 205 may be identified based on, for example, a handover path or backup mesh network device corresponding to a second best path metric. Mesh network device 205-*d* may then transmit a path response message, including a handover address of backup mesh network device 205-*c*, to mesh network device 205-*f* (e.g., via PREP transmission 215-*a*).

After receiving the PREP transmission 215-*a*, the mesh network device 205-*f* may store the address of mesh network device 205-*c* in the handover address field of its forwarding table. That is, mesh network devices 205 may maintain a forwarding table including information for directed forwarding or relay responsibilities. The forwarding table may include PO information, PD information, path information, etc. (e.g., such as <PO, PD>forwarding entries), such that when the mesh network device 205 receives communications via the mesh network, the mesh network device 205 may reference the forwarding table and determine whether or not to relay received communications (e.g., based on PO information, PD information, etc. included in the received communications). Further, mesh network devices 205 may include handover information, such as a path handover address, corresponding to such PO information, PD information, path information, etc. For example, in some cases, mesh network device 205-*f* may maintain a handover address for each PD included in its forwarding table, for each <PO, PD> entry, etc.

Therefore, in cases where mesh network device 205-*f* determines some handover condition has been satisfied (e.g., when mesh network device 205-*f* is to disassociate from one or more established directed forwarding paths), the mesh network device 205-*f* may perform any path handover procedures based on a maintained path handover addresses. For example, some handover conditions (e.g., a low battery status, removal of the mesh network device from the mesh network, etc.) may result in path handover procedures for several or all of the established paths in which mesh network device 205-*f* participates. Other handover conditions (e.g., load balancing conditions, mesh network device mobility relative to the PO and/or PD, etc.) may result in a path handover procedure for one or a few of the established paths in which mesh network device 205-*f* participates. Mesh network device 205-*f* may thus perform path handover procedures selectively based on various scenarios (e.g., based on various handover conditions) using handover address corresponding to certain established paths that the mesh network device 205-*f* may disassociate from. In the example of FIG. 2, if mesh network device 205-*f* is to disassociate from the established path A-E-F-D, mesh network device 205-*f* may perform a path handover procedure to handover the path to mesh network device 205-*c* (e.g., as the PREP transmission 215-*a* received during the initial path establishment procedure may indicate a handover address of mesh network device 205-*c*).

By extension, each selected hop in a path establishment procedure may also identify handover paths or backup mesh network devices. In general, during a path establishment procedure, downstream mesh network devices (e.g., mesh network devices between the PO and a PD) may receive PREQ transmissions from a PO and may forward PREQ messages (e.g., such that the PREQ message may be propagated further downstream to a PD). If selected during the path reply feedback of the path establishment procedure, the mesh network device may update its forwarding table to include both a forwarding entry for the <PO, PD> path, as well as a handover address for the <PO, PD> path. The selected mesh network device may then select a next hop (e.g., based on path metrics corresponding to the PREQ transmissions it received), identify a path handover candidate (e.g., based on another received PREQ transmission, path metrics associated with the other received PREQ transmissions, etc.), and include a handover address of the path handover candidate in the PREP transmission to the selected mesh network device.

In the example of FIG. 2, for the path establishment procedure to establish path A-E-F-D, each of mesh network device 205-*d*, mesh network device 205-*f*, and mesh network device 205-*e* may select an upstream hop or upstream mesh network device for the path establishment and may include a handover address for each hop. As such, should mesh network device 205-*e* and/or mesh network device 205-*f* disassociated from the path A-E-F-D, both of mesh network device 205-*e* and mesh network device 205-*f* may have a handover address to perform path handover (e.g., as described further with reference to FIG. 3). For example, mesh network device 205-*f* may include a handover address of mesh network device 205-*b* in the PREP transmission 215-*b* to mesh network device 205-*e* (e.g., such that if mesh network device 205-*e* is to disassociate from the path A-E-F-D, mesh network device 205-*e* may perform a handover procedure to handover the path to mesh network device 205-*b*). Further, mesh network device 205-*e* may include a handover address of mesh network device 205-*b* in the PREP transmission 215-*c* to mesh network device 205-*a* (e.g., such that if mesh network device 205-*a* is to disassociate from the path A-E-F-D, mesh network device 205-*a* may perform a handover procedure to handover the path to mesh network device 205-*b*).

As such, each intermediate mesh network device along a relay path (e.g., along a directed forwarding path) may maintain a handover address for the path. The backup mesh network device for path handover at each hop (e.g., for each intermediate mesh network device) may be identified by a mesh network device downstream from the intermediate mesh network device along the path. That is, each intermediate mesh network device may receive its path handover address (e.g., of a backup mesh network device for handover should the intermediate mesh network device disassociate from the path) in path response messages from the downstream mesh network device of the path. As such, if any intermediate mesh network device along an established path is to disassociate from the path, path handover procedures may be performed to modify the path or handover the path to another mesh network device. This may reduce or eliminate path reestablishment procedures in scenarios where intermediate mesh network devices go down or otherwise disassociate from the path. The described path establishment procedures and path handover techniques may thus reduce overhead and mesh network congestion arising from path reestablishment procedures (e.g., path establishment procedures arising from broken paths or failed relay communications), reduce mesh network latency (e.g., arising from delays due to path reestablishment procedures), etc.

Figure 3:
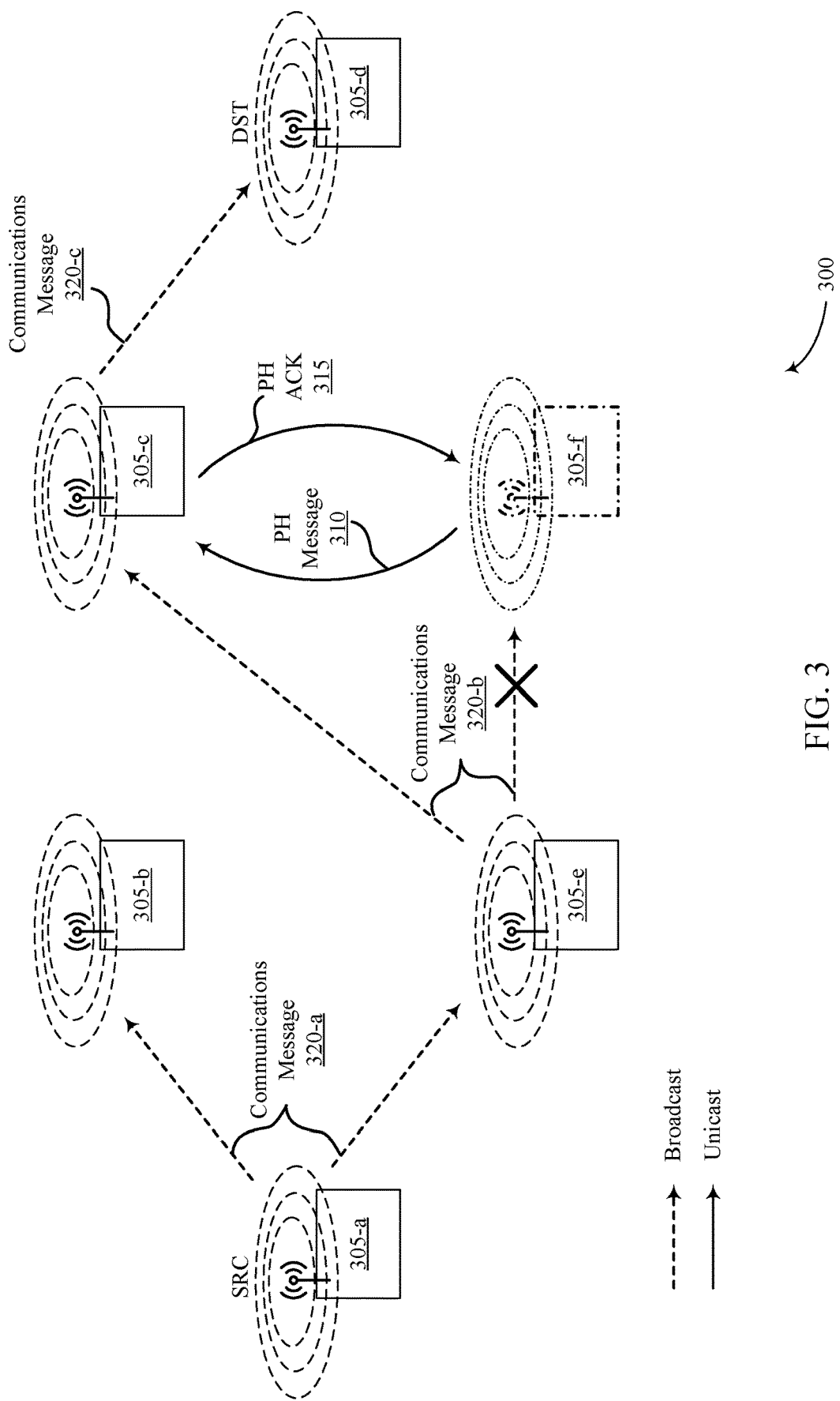
FIG. 3 illustrates an example of a mesh network that supports path handover in Bluetooth mesh routing in accordance with aspects of the present disclosure.

FIG. 3 illustrates an example of a mesh network 300 that supports path handover in Bluetooth mesh routing in accordance with aspects of the present disclosure. In some examples, mesh network 300 may implement aspects of wireless communications system 100 and/or mesh network 200. For example, mesh network 300 may include mesh network device 305-a, mesh network device 305-b, mesh network device 305-c, mesh network device 305-d, mesh network device 305-e, and mesh network device 305-f, which in some cases may be examples of mesh network devices 115 and mesh network devices 205 as described with reference to FIGS. 1 and 2. Mesh network 300 may implement path establishment procedures and path handover techniques described herein, and the example of FIG. 3 may illustrate a path handover procedure (e.g., a forwarding path handover procedure) between mesh network device 305-f and mesh network device 305-c.

For example, a source mesh network device 305-a may initiate a path establishment procedure to establish a path to a destination mesh network device 305-d. The path establishment procedure may establish a path A-E-F-D from the mesh network device 305-a to mesh network device 305-d, through intermediate mesh network device 305-e and intermediate mesh network device 305-f. In the example of FIG. 3, mesh network device 305-f may determine a handover condition has been satisfied, and thus determine that it will disassociate from the path A-E-F-D. As such, the mesh network device 305-f may initiate a handover procedure with mesh network device 305-c (e.g., as a handover address of mesh network device 305-c may have been included in a PREP message mesh network device 305-f received from mesh network device 305-d during the initial path establishment procedure). That is, before disassociating from the path, mesh network device 305-f may handover path details of <A, D> (e.g., path forwarding information of the path A-E-F-D, such as the PO=mesh network device 305-a, the PD=mesh network device 305-d, etc.) to the handover address of mesh network device 305-c.

The mesh network device 305-f may transmit (e.g., unicast) a path handover (PH) message 310 (e.g., a path handover entry (PH_ENTRY) message) to mesh network device 305-c using routing credentials. The path handover message 310 may include the forwarding table entry <PO=mesh network device 305-a, PD=mesh network device 305-d> of the mesh network device 305-f (e.g., mesh network device 305-f may convey its forwarding table entry information to mesh network device 305-c via the path handover message 310). After receiving the path handover message 310, mesh network device 305-c may store the entry in its forwarding table, and may forward future communications that correspond to the entry. In some cases, the mesh network device 305-c may then transmit a response or acknowledgment message (e.g., a path handover acknowledgment (PH_ACK) 315) back to mesh network device 305-f. PH_ACK 315 may indicate, to mesh network device 305-f, that the mesh network device 305-c has received the forwarding information. In other cases (e.g., if segmented messaging is being used), path handover responses or acknowledgments, such as PH_ACK 315, may not be implemented by the mesh network 300.

Once mesh network device 305-c has the forwarding entry of <PO=mesh network device 305-a, PD=mesh network device 305-d>, mesh network device 305-c may relay all the messages from mesh network device 305-a to mesh network device 305-d, and vice-versa. However, in some cases, until the mesh network device 305-f disassociates from the mesh network (e.g., during the duration that the handover procedure is being performed), mesh network device 305-f may continue to relay communications from mesh network device 305-a to mesh network device 305-d, and vice-versa. For example, the mesh network device 305-f may disassociate from the network after the mesh network device 305-f receives a PH_ACK 315. In other examples, path forwarding techniques may implement a path handover timeout. In such cases, after a path handover message 310 is sent by a mesh network device, the mesh network device may disassociate from a path upon expiration of the handover timeout (e.g., after sending PH_ENTRY message for handover, mesh network device 205-f may wait for some HANOVER_SETTLEUP_TIMEOUT before completely disassociating from the path and removing entry for <PO=mesh network device 305-a, PD=mesh network device 305-d> from its forwarding table).

In the example of FIG. 3, mesh network device 305-f may determine a handover condition has been satisfied and may perform a handover procedure with mesh network device 305-c (e.g., to handover the path A-E-F-D to mesh network device 305-c, and to disassociate from the path A-E-F-D). Mesh network device 305-f may unicast a path handover message 310 to mesh network device 305-c, the path handover message 310 may include path information such that the mesh network device 305-c may update its forwarding table and serve as the hop instead of mesh network device 305-f. In some cases, mesh network device 305-c may transmit a PH_ACK 315 to mesh network device 305-f, and the mesh network device 305-f may disassociate from the path. As such, for subsequent communications from the source mesh network device 305-a to the destination mesh network device 305-d, or vise-versa, mesh network device 305-c may forward the communications.

For example, mesh network device 305-a may broadcast data or information via communications message 320-a. Mesh network device 305-e may receive the communications message 320-a, and may forward the data or information (e.g., based on its forwarding table including a <PO=mesh network device 305-a, PD=mesh network device 305-d> entry). Conversely, mesh network device 305-b may receive the communications message 320-a, and may drop the data or information (e.g., may not forward the data or information) as the mesh network device 305-b may not have a <PO=mesh network device 305-a, PD=mesh network device 305-d> entry, as the mesh network device 305-b was not selected during the initial path establishment procedure. Mesh network device 305-e may forward (e.g., broadcast) the data or information via communications message 320-b. As mesh network device 305-f performed a handover procedure with mesh network device 305-c, mesh network device 305-c may now forward the data or information (e.g., via communications message 320-c). That is, as mesh network device 305-f may disassociate from the path, mesh network device 305-f may no longer forward the data or information along the path, and the A-E-F-D path may be effectively modified or handed over to path A-E-C-D. As such, mesh network device 305-f may disassociate from the path, and the mesh network device 305-d may receive the data or information (e.g., from mesh network device 305-a) via communications message 320-c (e.g., without having to perform additional path establishment procedures to establish the path A-E-C-D).

Figure 4:
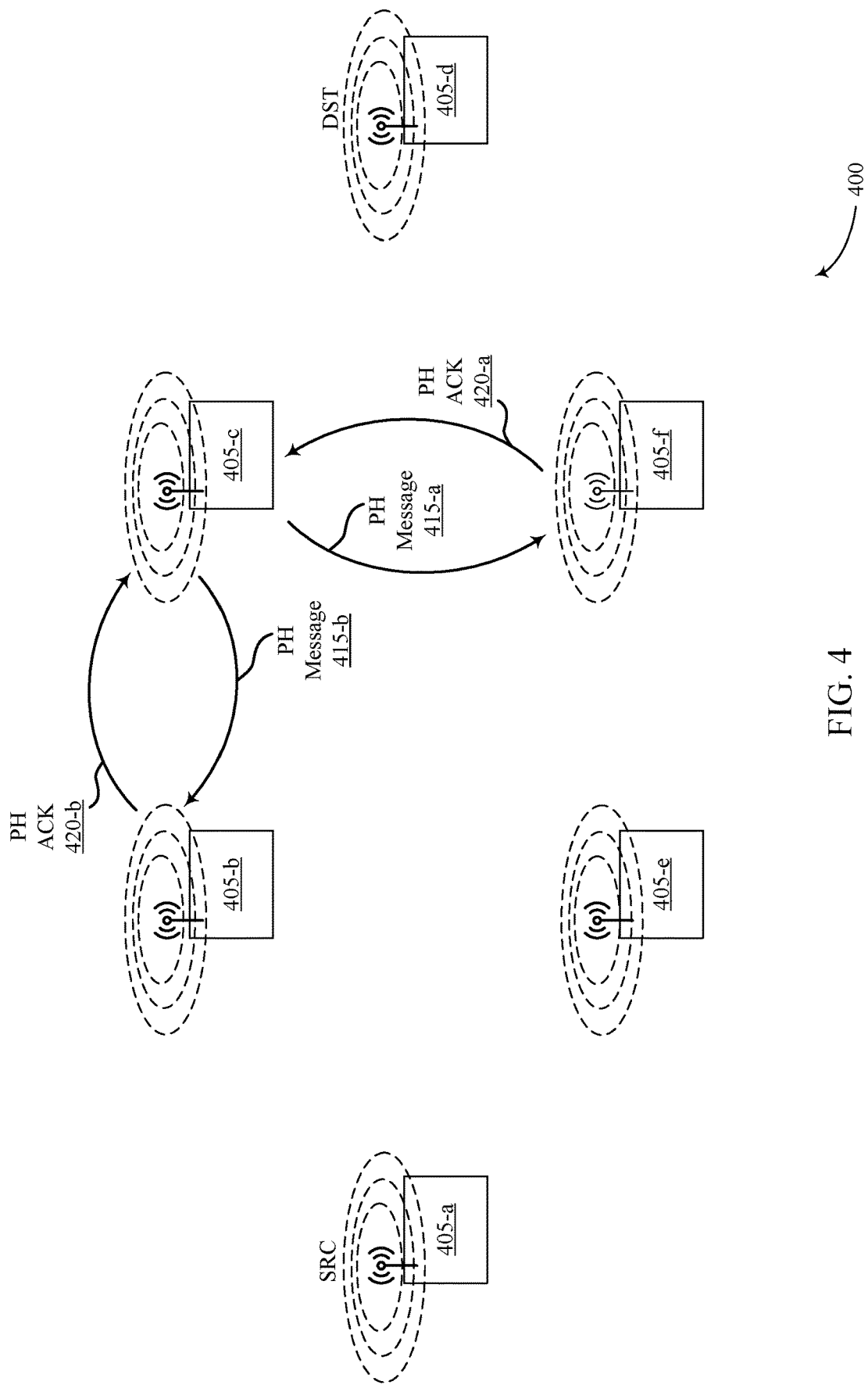
FIG. 4 illustrates an example of a mesh network that supports path handover in Bluetooth mesh routing in accordance with aspects of the present disclosure.

FIG. 4 illustrates an example of a mesh network 400 that supports path handover in Bluetooth mesh routing in accordance with aspects of the present disclosure. In some examples, mesh network 400 may implement aspects of wireless communications system 100, mesh network 200, and/or mesh network 300. For example, mesh network 400 may include mesh network device 405-a, mesh network device 405-*b*, mesh network device 405-*c*, mesh network device 405-*d*, mesh network device 405-*e*, and mesh network device 405-*f*, which in some cases may be examples of mesh network devices 115, mesh network devices 205, and mesh network devices 305 as described with reference to FIGS. 1, 2, and 3. Mesh network 400 may implement path establishment procedures and path handover techniques described herein, and the example of FIG. 4 may illustrate dynamic load balancing techniques performed by mesh network device 405-*c*.

For example, mesh network device 405-*c* may perform load balancing techniques via path handover, as described herein. In the example of FIG. 3, mesh network device 405-*c* may be overloaded with many paths (e.g., with relay or forwarding obligations of several established forwarding paths) and hence may have a full forwarding table or a forwarding table with a number of forwarding entries that exceeds some threshold. Therefore, mesh network device 405-*c* may handover one or more paths to its neighboring mesh network device 405-*b* and/or neighboring mesh network device 405-*f*.

In general, mesh network devices 405 may perform path handover techniques for load balancing when any load balancing condition is satisfied (e.g., when a load balancing parameter exceeds some threshold). For example, load balancing parameters may include a number of entries in a forwarding table, a percentage or remaining capacity of a forwarding table, a NUF parameter, a CNC parameter, a buffer status parameter, etc. The mesh network 400 may configure various thresholds for load balancing, such that when some load balancing parameter exceeds a threshold, the mesh network device may perform load balancing techniques to handover one or more paths to other mesh network devices in the mesh network.

As an example, mesh network device 405-*c* may determine or identify that its forwarding table is full or is approaching the full capacity of the forwarding table. The mesh network device 405-*c* may determine or identify one or more paths to be transferred to mesh network device 405-*f* and/or mesh network device 405-*b*. Determination of which paths are to be handed over may depend on mesh network implementation. For example, in some cases paths may be associated with different priority, and lower priority paths may be handed over. Other examples of criteria for determining paths to handover for load balancing techniques may include handing over the paths with lower path metrics, handing over paths based on the relative forwarding obligations or relay frequency associated with the various paths, etc. However, once the paths for handover are determined, the handover procedures may be performed in accordance with the handover address specified for that path.

That is, paths selected for handover (e.g., for load balancing by a mesh network device 405-*c*) may include the oldest paths from the forwarding table, the paths which are not frequently being used (e.g. packet count may be maintained for each path and the one with the lowest count may be selected for the handover), the paths with the lowest path metric ratings, the paths may be selected randomly, etc. In the example of FIG. 4, mesh network device 405-*c* may select one or more paths to handover to mesh network device 405-*b* and one or more paths to handover to mesh network device 405-*f*. Mesh network device 405-*c* may send a path handover message 415-*a* (e.g., a PH_ENTRY message) to mesh network device 405-*f*, and the a path handover message 415-*a* may include one or more forwarding table entries which are to be handed over to the mesh network device 405-*f*. Mesh network device 405-*c* may send a path handover message 415-*b* (e.g., a PH_ENTRY message) to mesh network device 405-*b*, and the a path handover message 415-*b* may include one or more forwarding table entries which are to be handed over to the mesh network device 405-*b*. In some cases, mesh network device 405-*f* and mesh network device 405-*b* may transmit PH_ACK 420-*a* and PH_ACK 420-*b*, respectively, in response to the path handover messages 415. This way, dynamic load balancing may be achieved, and mesh network devices 405 may be able to be take new path requests even when the forwarding table is full or close to full.

The techniques described herein may provide for improved path establishment, improved forwarding table management, path handover, improved relay disassociation, etc. The described techniques may reduce or avoid the unnecessary congestion which may otherwise arise due to path reestablishment procedures (e.g., due to rediscovery of broken paths). The path handover techniques may leave the path metric value intact (e.g., the original quality of service (QoS) may be maintained). Such may reduce or avoid the latency build up for the PO mesh network device arising from path reestablishment or path rediscovery procedures. The described techniques may also help mesh network devices 405 when they are not moving away or going down, but where they have reached some conditions where they cannot accept request for new paths (e.g., the described techniques may provide for efficient load balancing procedures, such that mesh network devices 405 may be able to take new path requests and handover other paths). Further, the described techniques may allow for moving mesh network devices 405 to be added in the path and hence may improve routing procedure efficiency. The described techniques may reduce overhead (e.g., mesh network congestion) also by reducing or removing usage of extra PERROR message which may be exchanged because of a mesh network device disassociating from a path.

Figure 5:
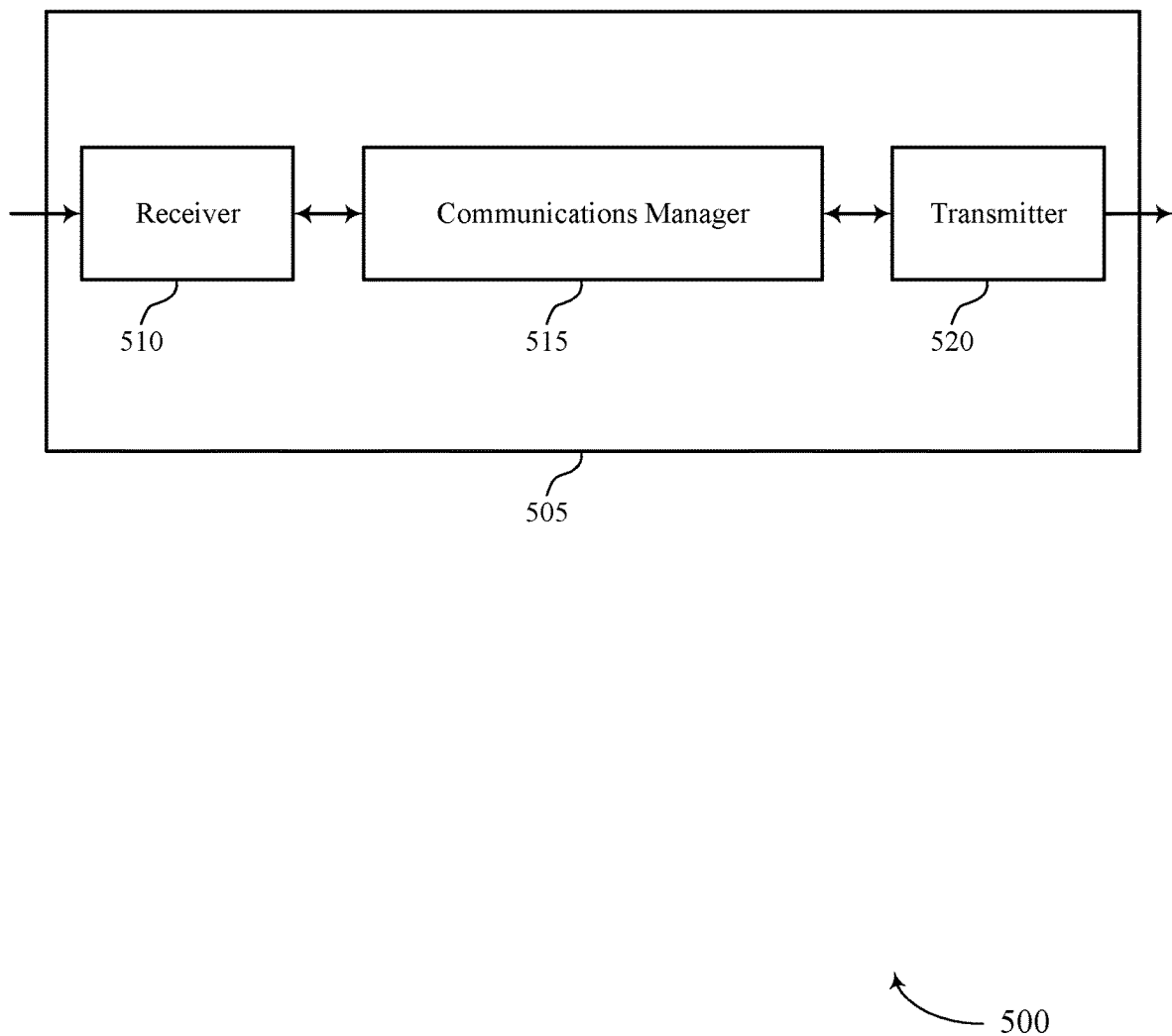
FIGS. 5 and 6 show block diagrams of devices that support path handover in Bluetooth mesh routing in accordance with aspects of the present disclosure.

FIG. 5 shows a block diagram 500 of a device 505 that supports path handover in Bluetooth mesh routing in accordance with aspects of the present disclosure. The device 505 may be an example of aspects of a mesh network device 115, a mesh network device 205, a mesh network device 305, or a mesh network device 405 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to path handover in Bluetooth mesh routing, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, during a directed forwarding discovery procedure, a first path establishment message from a second device, where the first path establishment message includes a handover address of a third device, store the handover address of the third device in a forwarding table entry associated with the second device, determine a handover condition has been satisfied, and transmit a path handover message to the third device based on the satisfied handover condition and the forwarding table entry, where the path handover message includes path forwarding information associated with the second device.

The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
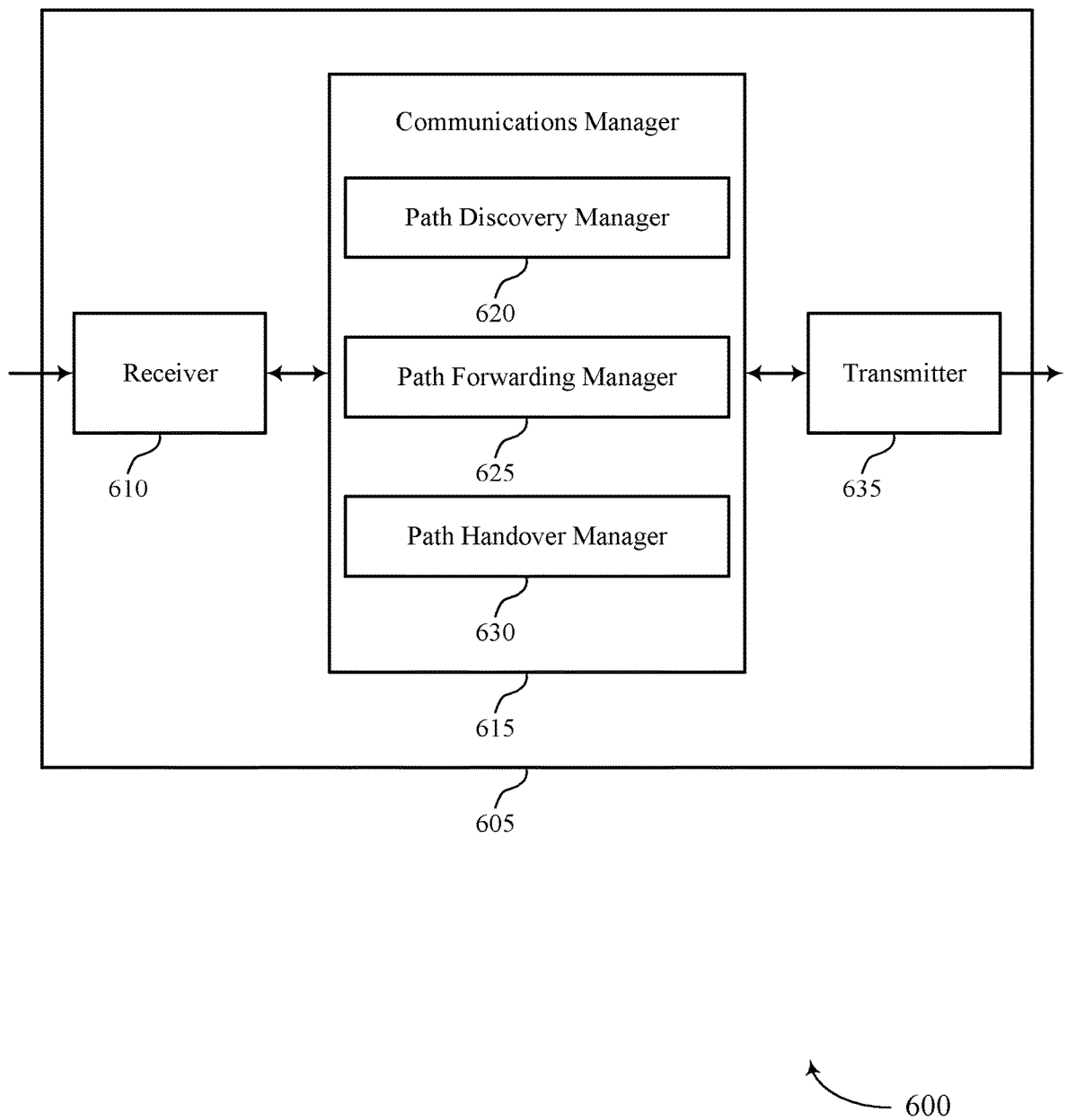

FIG. 6 shows a block diagram 600 of a device 605 that supports path handover in Bluetooth mesh routing in accordance with aspects of the present disclosure. The device 605 may be an example of aspects of a mesh network device 115, a mesh network device 205, a mesh network device 305, a mesh network device 405, or a device 505 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to path handover in Bluetooth mesh routing, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a path discovery manager 620, a path forwarding manager 625, and a path handover manager 630. The communications manager 615 may be an example of aspects of the communications manager 810 described herein.

The path discovery manager 620 may receive, during a directed forwarding discovery procedure, a first path establishment message from a second device, where the first path establishment message includes a handover address of a third device. The path forwarding manager 625 may store the handover address of the third device in a forwarding table entry associated with the second device. The path handover manager 630 may determine a handover condition has been satisfied and transmit a path handover message to the third device based on the satisfied handover condition and the forwarding table entry, where the path handover message includes path forwarding information associated with the second device.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
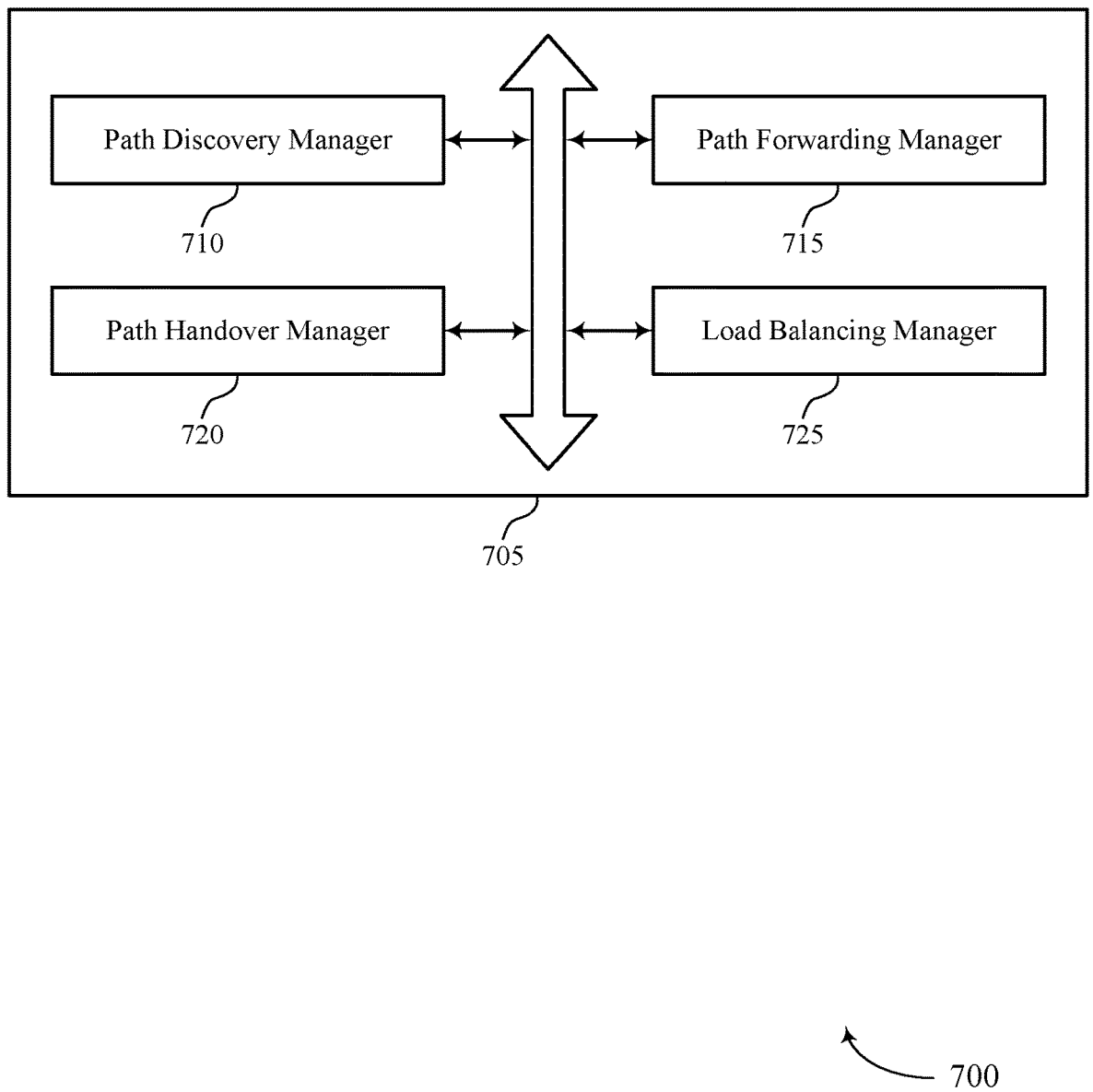
FIG. 7 shows a block diagram of a communications manager that supports path handover in Bluetooth mesh routing in accordance with aspects of the present disclosure.

FIG. 7 shows a block diagram 700 of a communications manager 705 that supports path handover in Bluetooth mesh routing in accordance with aspects of the present disclosure. The communications manager 705 may be an example of aspects of a communications manager 515, a communications manager 615, or a communications manager 810 described herein. The communications manager 705 may include a path discovery manager 710, a path forwarding manager 715, a path handover manager 720, and a load balancing manager 725. Each of these modules may communicate, directly or indirectly, with one another (e.g., via one or more buses).

For example, in some cases a mesh network device 305-*f* may include a path discovery manager 710. The path discovery manager 710 may receive, during a directed forwarding discovery procedure, a first path establishment message from a second device (e.g., mesh network device 305-*d*), where the first path establishment message includes a handover address of a third device (e.g., mesh network device 305-*c*).

The path forwarding manager 715 may store the handover address of the third device (e.g., mesh network device 305-*c*) in a forwarding table entry associated with the second device (e.g., mesh network device 305-*d*). For example, the path forwarding manager 715 may update the forwarding table of the mesh network device 305-*f* to include <PO=mesh network device 305-*a*, PD=mesh network device 305-*d*>, and may also include the handover address of mesh network device 305-*c* in case of handover for the <PO=mesh network device 305-*a*, PD=mesh network device 305-*d*> path.

The path handover manager 720 may determine a handover condition has been satisfied. For example, the path handover manager 720 may determine to move away from the network, where the determination that the handover condition has been satisfied is based on the determination to move away from the network. In some examples, the path handover manager 720 may identify a low battery condition, where the determination that the handover condition has been satisfied is based on the low battery condition. In some examples, the load balancing manager 725 may identify a load balancing parameter has exceeded a threshold based on a number of forwarding entries included in a forwarding table, where the determination that the handover condition has been satisfied is based on the identification that the load balancing parameter has exceeded the threshold. The path handover manager 720 may transmit a path handover message to the third device (e.g., mesh network device 305-*c*) based on the satisfied handover condition and the forwarding table entry, where the path handover message includes path forwarding information associated with the second device (e.g., mesh network device 305-*d*). In some cases, the path handover message is transmitted to the third device based on a routing credential of the first device.

In some examples, the path handover manager 720 (e.g., of mesh network device **305-*f*) may receive a path handover acknowledgment from the third device (e.g., mesh network device 305-*c*). In some examples, the path handover manager 720 may cause the device (e.g., mesh network device 305-*f*) to drop from the mesh network based on the received path handover acknowledgment. In some examples, the path handover manager 720** may determine a handover timeout has expired, where the handover timeout is based on the transmitted path handover message.

In some examples, the path discovery manager 710 may receive a first path request message from a fourth device (e.g., mesh network device **305-*e*). In some examples, transmitting a second path establishment message to a fourth device (e.g., mesh network device 305-*e*), where the second path establishment message includes a handover address of a fifth device (e.g., mesh network device 305-*b*). In some examples, the path discovery manager 710 may transmit a second path request message to the second device (e.g., mesh network device 305-*d*) based on the received first path request message. In some examples, the path discovery manager 710 may receive the first path establishment message from the second device (e.g., mesh network device 305-*d***) based on the transmitted second path request message.

Figure 8:
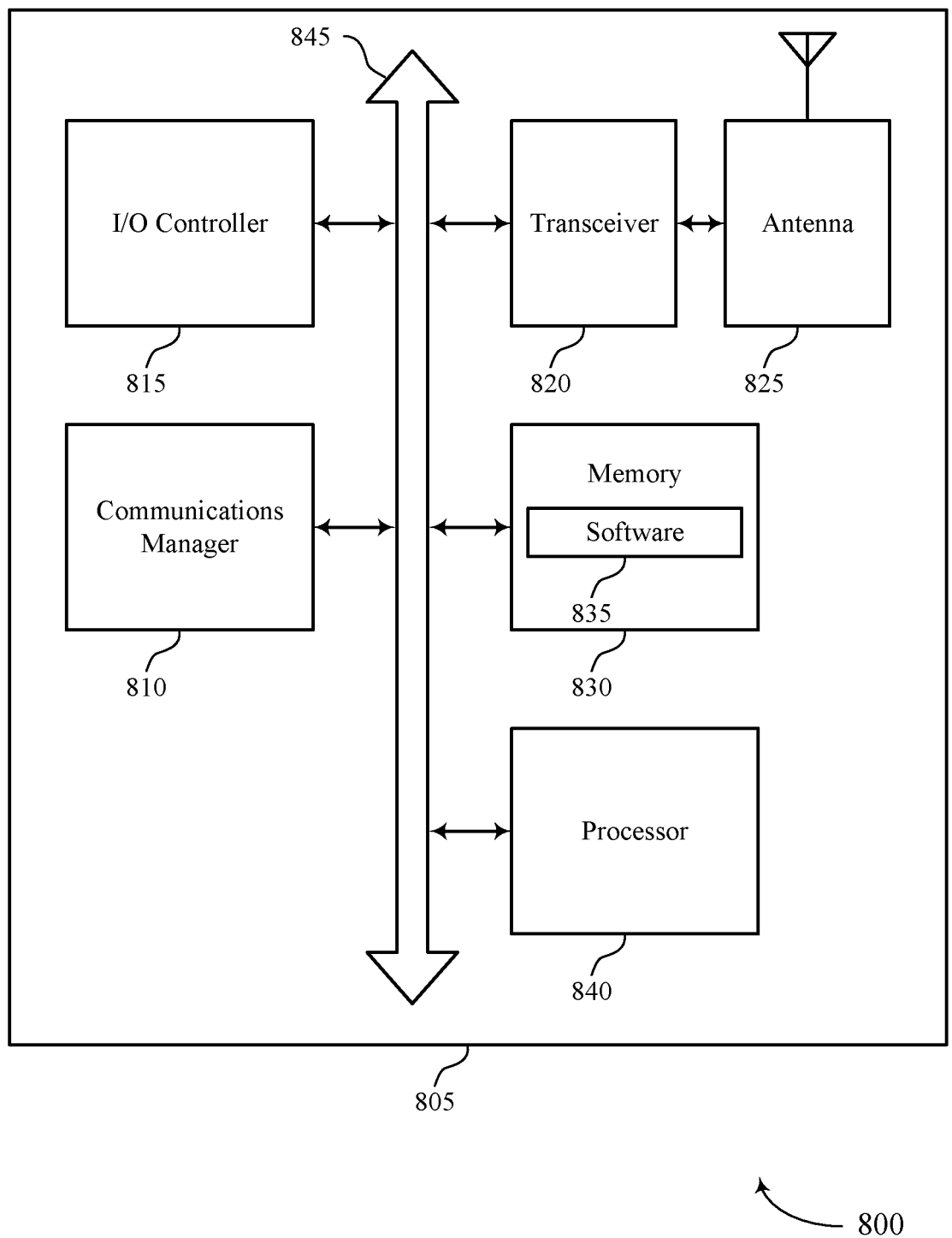
FIG. 8 shows a diagram of a system including a device that supports path handover in Bluetooth mesh routing in accordance with aspects of the present disclosure.

FIG. 8 shows a diagram of a system 800 including a device 805 that supports path handover in Bluetooth mesh routing in accordance with aspects of the present disclosure. The device 805 may be an example of or include the components of device 505, device 605, or a device as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, during a directed forwarding discovery procedure, a first path establishment message from a second device, where the first path establishment message includes a handover address of a third device, store the handover address of the third device in a forwarding table entry associated with the second device, determine a handover condition has been satisfied, and transmit a path handover message to the third device based on the satisfied handover condition and the forwarding table entry, where the path handover message includes path forwarding information associated with the second device.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code or software 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting path handover in Bluetooth mesh routing).

The software 835 may include instructions to implement aspects of the present disclosure, including instructions to support wireless communications in a mesh network. The software 835 may be stored in a non-transitory computer-readable medium such as system memory or other type of memory. In some cases, the software 835 may not be directly executable by the processor 840 but may cause a computer (e.g., when compiled and executed) to perform functions described herein.

Figure 9:
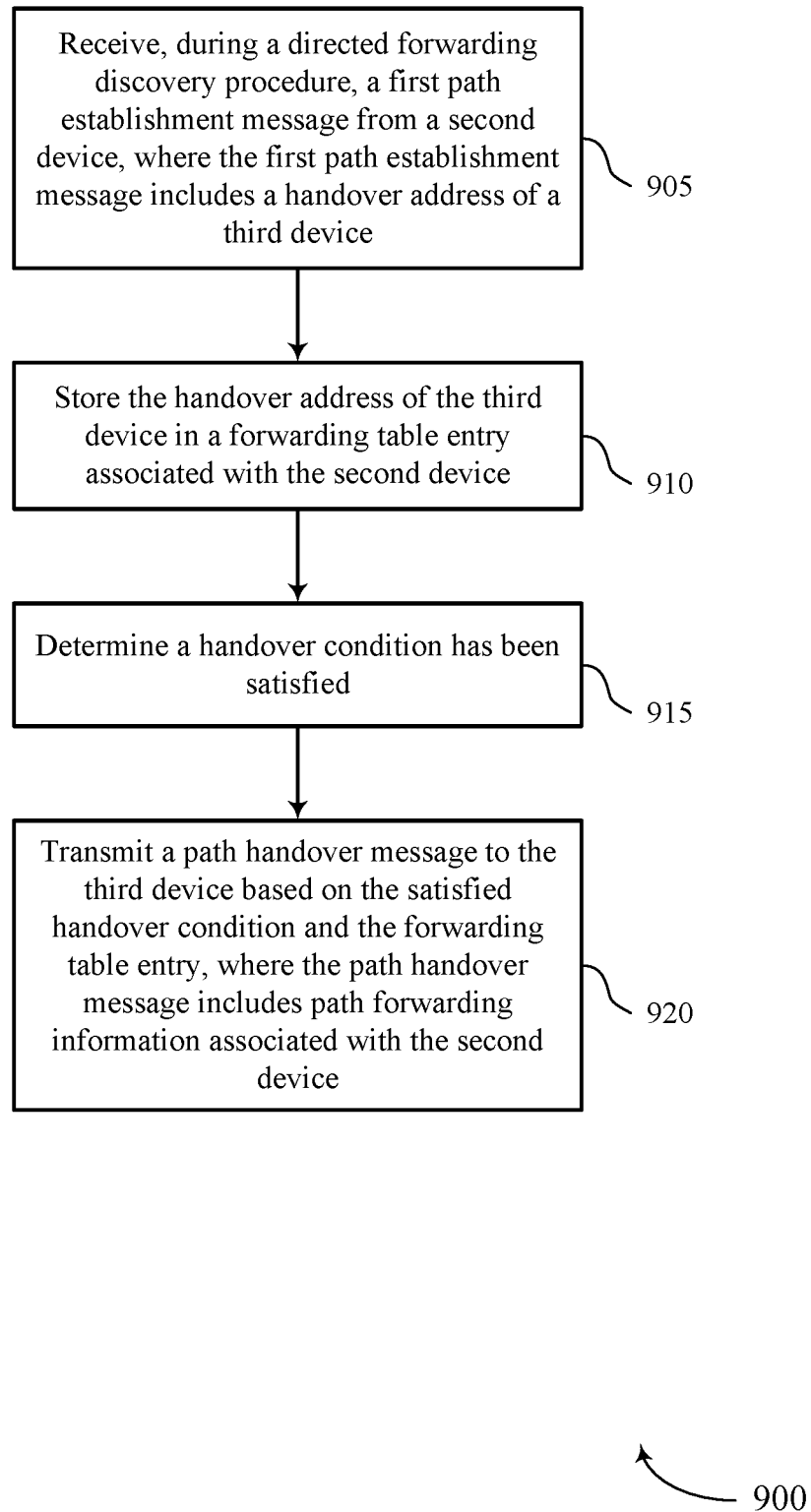
FIGS. 9 and 10 show flowcharts illustrating methods that support path handover in Bluetooth mesh routing in accordance with aspects of the present disclosure.

FIG. 9 shows a flowchart illustrating a method 900 that supports path handover in Bluetooth mesh routing in accordance with aspects of the present disclosure. The operations of method 900 may be implemented by a device or its components as described herein. For example, the operations of method 900 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 905, the device may receive, during a directed forwarding discovery procedure, a first path establishment message from a second device, where the first path establishment message includes a handover address of a third device. The operations of 905 may be performed according to the methods described herein. In some examples, aspects of the operations of 905 may be performed by a path discovery manager as described with reference to FIGS. 5 through 8.

At 910, the device may store the handover address of the third device in a forwarding table entry associated with the second device. The operations of 910 may be performed according to the methods described herein. In some examples, aspects of the operations of 910 may be performed by a path forwarding manager as described with reference to FIGS. 5 through 8.

At 915, the device may determine a handover condition has been satisfied. The operations of 915 may be performed according to the methods described herein. In some examples, aspects of the operations of 915 may be performed by a path handover manager as described with reference to FIGS. 5 through 8.

At 920, the device may transmit a path handover message to the third device based on the satisfied handover condition and the forwarding table entry, where the path handover message includes path forwarding information associated with the second device. The operations of 920 may be performed according to the methods described herein. In some examples, aspects of the operations of 920 may be performed by a path handover manager as described with reference to FIGS. 5 through 8.

Figure 10:
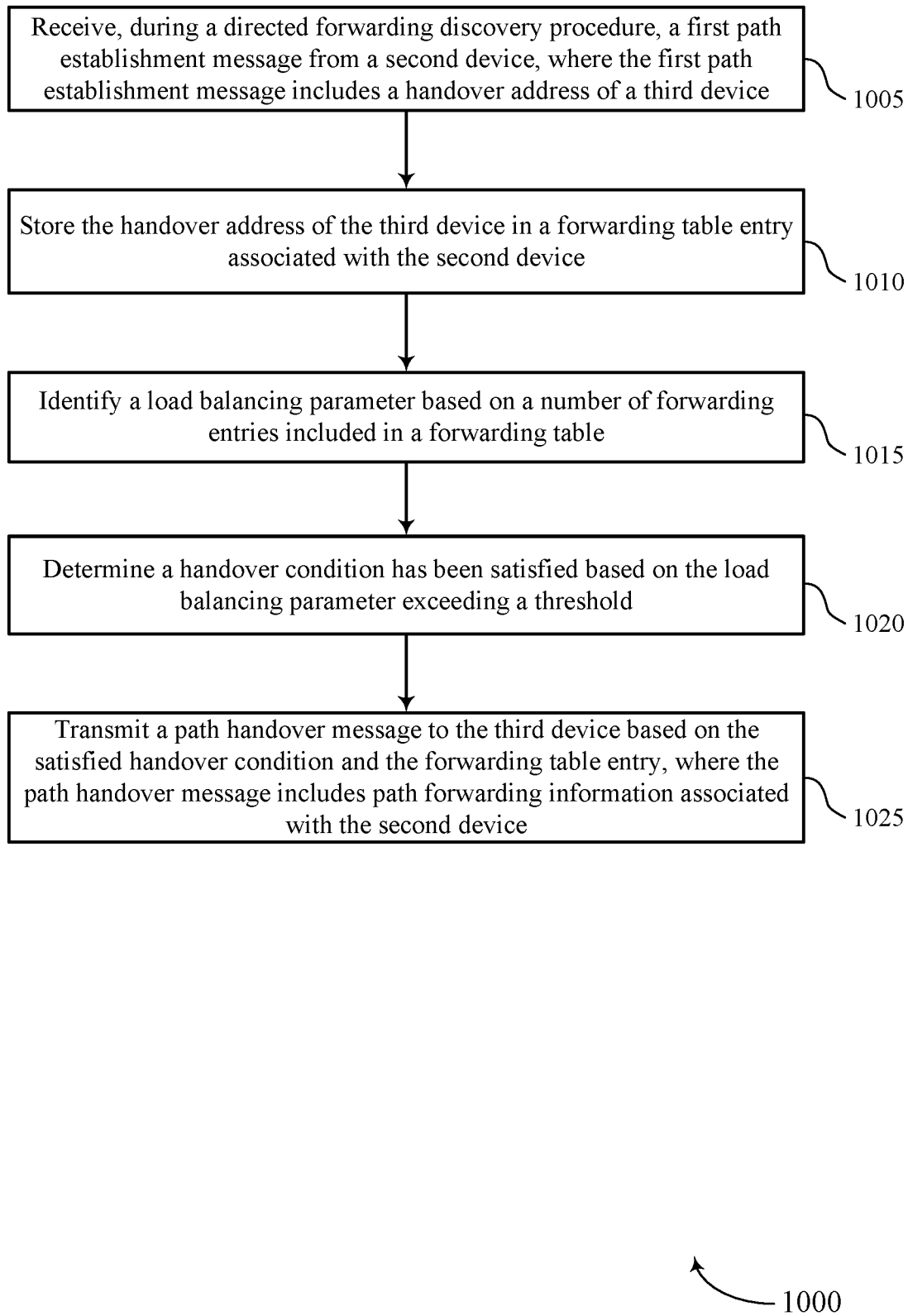

FIG. 10 shows a flowchart illustrating a method 1000 that supports path handover in Bluetooth mesh routing in accordance with aspects of the present disclosure. The operations of method 1000 may be implemented by a device or its components as described herein. For example, the operations of method 1000 may be performed by a communications manager as described with reference to FIGS. 5 through 8. In some examples, a device may execute a set of instructions to control the functional elements of the device to perform the functions described below. Additionally or alternatively, a device may perform aspects of the functions described below using special-purpose hardware.

At 1005, the device may receive, during a directed forwarding discovery procedure, a first path establishment message from a second device, where the first path establishment message includes a handover address of a third device. The operations of 1005 may be performed according to the methods described herein. In some examples, aspects of the operations of 1005 may be performed by a path discovery manager as described with reference to FIGS. 5 through 8.

At 1010, the device may store the handover address of the third device in a forwarding table entry associated with the second device. The operations of 1010 may be performed according to the methods described herein. In some examples, aspects of the operations of 1010 may be performed by a path forwarding manager as described with reference to FIGS. 5 through 8.

At 1015, the device may identify a load balancing parameter (e.g., based on a number of forwarding entries included in a forwarding table). For example, in some cases, the load balancing parameter may be identified based at least in part on the stored handover address of the third device in the forwarding table entry (e.g., the load balancing parameter may be determined based on the one or more handover addresses stored in the forwarding table). The operations of 1015 may be performed according to the methods described herein. In some examples, aspects of the operations of 1015 may be performed by a load balancing manager as described with reference to FIGS. 5 through 8.

At 1020, the device may determine a handover condition has been satisfied. For example, the device may determine the load balancing parameter has exceeded a threshold based on a number of forwarding entries included in a forwarding table (e.g., the determination that the handover condition has been satisfied may be based on the identification that the load balancing parameter has exceeded the threshold). The operations of 1020 may be performed according to the methods described herein. In some examples, aspects of the operations of 1020 may be performed by a path handover manager as described with reference to FIGS. 5 through 8.

At 1025, the device may transmit a path handover message to the third device based on the satisfied handover condition and the forwarding table entry, where the path handover message includes path forwarding information associated with the second device. The operations of 1025 may be performed according to the methods described herein. In some examples, aspects of the operations of 1025 may be performed by a path handover manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications in a mesh network, at a first device, comprising:
receiving, during a directed forwarding discovery procedure to establish a path between the first device and a destination device, a first path establishment message from a second device along the path, wherein the first path establishment message comprises a handover address of a third device along the path;

storing the handover address of the third device in a forwarding table entry associated with the second device;

determining a handover condition has been satisfied;

encrypting a path handover message based at least in part on a routing credential of the first device; and transmitting the encrypted path handover message to the third device based at least in part on the satisfied handover condition and the forwarding table entry, wherein the encrypted path handover message comprises path forwarding information associated with the second device.

2. The method of claim 1, further comprising:

transmitting a second path establishment message to a fourth device along the path, wherein the second path establishment message comprises a handover address of a fifth device along the path.

3. The method of claim 1, wherein determining the handover condition has been satisfied further comprises:

identifying a load balancing parameter has exceeded a threshold based at least in part on a number of forwarding entries included in a forwarding table, wherein the determination that the handover condition has been satisfied is based at least in part on the identification that the load balancing parameter has exceeded the threshold.

4. The method of claim 1, further comprising:

determining to move away from the network, wherein the determination that the handover condition has been satisfied is based at least in part on the determination to move away from the network.

5. The method of claim 1, further comprising:

identifying a low battery condition, wherein the determination that the handover condition has been satisfied is based at least in part on the low battery condition.

6. The method of claim 1, further comprising:

receiving a path handover acknowledgment from the third device; and dropping from the mesh network based at least in part on the received path handover acknowledgment.

7. The method of claim 1, further comprising:

determining a handover timeout has expired, wherein the handover timeout is based at least in part on the transmitted encrypted path handover message.

8. The method of claim 1, further comprising:

receiving a first path request message from a fourth device along the path;

transmitting a second path request message to the second device based at least in part on the received first path request message; and receiving the first path establishment message from the second device based at least in part on the transmitted second path request message.

9. The method of claim 1, wherein the encrypted path handover message is transmitted to the third device based at least in part on a routing credential of the first device.

10. An apparatus for wireless communications in a mesh network, at a first device, comprising:

a processor, memory in electronic communication with the processor; and instructions stored in the memory and executable by the processor to cause the apparatus to:

receive, during a directed forwarding discovery procedure to establish a path between the first device and a destination device, a first path establishment message from a second device along the path, wherein the first path establishment message comprises a handover address of a third device along the path;

store the handover address of the third device in a forwarding table entry associated with the second device;

determine a handover condition has been satisfied;

encrypt a path handover message based at least in part on a routing credential of the first device; and transmit the encrypted path handover message to the third device based at least in part on the satisfied handover condition and the forwarding table entry, wherein the encrypted path handover message comprises path forwarding information associated with the second device.

11. The apparatus of claim 10, wherein the instructions are further executable by the processor to cause the apparatus to:

transmit a second path establishment message to a fourth device along the path, wherein the second path establishment message comprises a handover address of a fifth device along the path.

12. The apparatus of claim 10, wherein the instructions to determine the handover condition has been satisfied further are executable by the processor to cause the apparatus to:

identify a load balancing parameter has exceeded a threshold based at least in part on a number of forwarding entries included in a forwarding table, wherein the determination that the handover condition has been satisfied is based at least in part on the identification that the load balancing parameter has exceeded the threshold.

13. The apparatus of claim 10, wherein the instructions are further executable by the processor to cause the apparatus to:

determine to move away from the network, wherein the determination that the handover condition has been satisfied is based at least in part on the determination to move away from the network.

14. The apparatus of claim 10, wherein the instructions are further executable by the processor to cause the apparatus to:

identify a low battery condition, wherein the determination that the handover condition has been satisfied is based at least in part on the low battery condition.

15. The apparatus of claim 10, wherein the instructions are further executable by the processor to cause the apparatus to:

receive a path handover acknowledgment from the third device; and drop from the mesh network based at least in part on the received path handover acknowledgment.

16. The apparatus of claim 10, wherein the instructions are further executable by the processor to cause the apparatus to:

determine a handover timeout has expired, wherein the handover timeout is based at least in part on the transmitted encrypted path handover message.

17. The apparatus of claim 10, wherein the instructions are further executable by the processor to cause the apparatus to:

receive a first path request message from a fourth device along the path;

transmit a second path request message to the second device based at least in part on the received first path request message; and receive the first path establishment message from the second device based at least in part on the transmitted second path request message.

18. The apparatus of claim 10, wherein the encrypted path handover message is transmitted to the third device based at least in part on a routing credential of the first device.

19. An apparatus for wireless communications in a mesh network, at a first device, comprising:
- means for receiving, during a directed forwarding discovery procedure to establish a path between the first device and a destination device, a first path establishment message from a second device along the path, wherein the first path establishment message comprises a handover address of a third device along the path;
- means for storing the handover address of the third device in a forwarding table entry associated with the second device;
- means for determining a handover condition has been satisfied;
- means for encrypting a path handover message based at least in part on a routing credential of the first device; and
- means for transmitting Flail the encrypted path handover message to the third device based at least in part on the satisfied handover condition and the forwarding table entry, wherein the encrypted path handover message comprises path forwarding information associated with the second device.

20. The apparatus of claim 19, further comprising:
- means for transmitting a second path establishment message to a fourth device along the path, wherein the second path establishment message comprises a handover address of a fifth device along the path.

* * * * *